(12) United States Patent
Ohta et al.

(10) Patent No.: US 11,012,909 B2
(45) Date of Patent: May 18, 2021

(54) WIRELESS COMMUNICATION METHOD, WIRELESS COMMUNICATION SYSTEM, BASE STATION, AND WIRELESS STATION

(71) Applicant: FUJITSU CONNECTED TECHNOLOGIES LIMITED, Kawasaki (JP)

(72) Inventors: Yoshiaki Ohta, Yokohama (JP); Shinichiro Aikawa, Yokohama (JP)

(73) Assignee: FUJITSU CONNECTED TECHNOLOGIES LIMITED, Kawasaki (JP)

( * ) Notice: Subject to any disclaimer, the term of this patent is extended or adjusted under 35 U.S.C. 154(b) by 0 days.

(21) Appl. No.: 15/220,754

(22) Filed: Jul. 27, 2016

(65) Prior Publication Data

US 2016/0337924 A1 Nov. 17, 2016

Related U.S. Application Data

(63) Continuation of application No. PCT/JP2014/000539, filed on Jan. 31, 2014.

(51) Int. Cl.
*H04W 36/28* (2009.01)
*H04W 36/08* (2009.01)
(Continued)

(52) U.S. Cl.
CPC .............. *H04W 36/28* (2013.01); *H04L 5/00* (2013.01); *H04L 5/001* (2013.01);
(Continued)

(58) Field of Classification Search
CPC . H04W 36/28; H04W 36/38; H04W 36/0055; H04W 76/00; H04W 36/08; H04L 5/001; H04L 5/00
See application file for complete search history.

(56) References Cited

U.S. PATENT DOCUMENTS

2013/0215772 A1* 8/2013 Kaur .................... H04W 76/15
370/252
2015/0017993 A1* 1/2015 Ishii .................. H04W 36/0069
455/444

(Continued)

FOREIGN PATENT DOCUMENTS

KR 10-2017-0140442 A 12/2017
WO 2013/133871 A1 9/2013
WO 2013/157537 A1 10/2013

OTHER PUBLICATIONS

ZTE Corporation, "Discussion on Handover Procedure for Small Cell," 3GPP TSG-RAN2 Meeting #85, R2-140114, Jan. 27, 2014 (htttp://wwvww3 gpp.org/ftp/tsg_ran/WG2_RL2/TSGR2_85/docs/) (Year: 2014).*

(Continued)

*Primary Examiner* — Andrew Lai
*Assistant Examiner* — Chuong M Nguyen
(74) *Attorney, Agent, or Firm* — Myers Wolin, LLC

(57) ABSTRACT

A wireless communication method including: when a wireless station has dual connectivity to a first base station that is a primary base station and a second base station that is a secondary base station and when a handover of the primary base station is to be performed from the first base station to a third base station, transmitting from the first base station to the third base station a first signal requesting the handover, when the third base station makes a determination not to change the secondary base station based on the first signal, transmitting from the third base station to the second base station a second signal indicating the determination and to the first base station a third signal indicating the determination, and performing the handover based on the third (Continued)

signal without transferring a connection between the wireless station and the second base station to the first base station.

9 Claims, 23 Drawing Sheets

(51) Int. Cl.
    *H04W 36/00*     (2009.01)
    *H04L 5/00*     (2006.01)
    *H04W 36/38*     (2009.01)

(52) U.S. Cl.
    CPC ....... *H04W 36/0069* (2018.08); *H04W 36/08* (2013.01); *H04W 36/38* (2013.01)

(56) References Cited

U.S. PATENT DOCUMENTS

| | | | | |
|---|---|---|---|---|
| 2015/0117405 A1* | 4/2015 | Takahashi | ............ | H04L 5/0098 370/331 |
| 2015/0312810 A1* | 10/2015 | Yasuda | ................. | H04W 36/38 370/338 |
| 2015/0350969 A1* | 12/2015 | Dudda | .............. | H04W 36/0055 370/331 |
| 2015/0358865 A1* | 12/2015 | Fu | ...................... | H04W 36/0058 455/436 |
| 2016/0021581 A1* | 1/2016 | Deenoo | ............. | H04W 36/0055 370/331 |
| 2016/0278030 A1* | 9/2016 | Yi | ......................... | H04W 56/00 |

OTHER PUBLICATIONS

ZTE Corporation, "Discussion on handover procedure for small cell," R2-140114, Jan. 27, 2014 (FTP:http://www.3gpp.org/ftp/tsg_ran/WG2_RL2/TSGR2_85/docs/) (Year: 2014).*
ZTE Corporation, "Discussion on handover procedure for small cell," R2-140114, Jan. 27, 2014 (Year: 2014).*
CMCC, "HO signaling flow for small cell enhancement" R3-132227, Nov. 11-15, 2013 (Year: 2013).*
Notification of Reasons for Refusal issued by the Japan Patent Office for corresponding Japanese Patent Application No. 2015-559615, dated Oct. 3, 2017, with an English translation.
3GPP TR 36.842 V12.0.0 (Dec. 2013)3rd Generation Partnership Project;Technical Specification Group Radio Access Network; Study on Small Cell enhancements for E-UTRA and E-UTRAN; Higher layer aspects (Release 12), Dec. 2013.
Notice of Final Rejection issued by the Korean Intellectual Property Office for corresponding Korean Patent Application No. 10-2016-7021889, dated Sep. 12, 2017, with English translation.
ZTE Corporation: "Discussion on handover procedure for small cell", Agenda Item: 7.2.1, 3GPP TSG-RAN WG2 Meeting #85, R2-140114, Prague, Czech Republic, Jan. 10-14, 2014.
CMCC: "HO signaling flow for small cell enhancement", Agenda Item: 20.2, 3GPP TSG-RAN WG3 Meeting #82, R3-132227, San Francisco, USA, Nov. 11-15, 2013.
NSN et al: "Handover procedure in case of bearer only served by SeNB(1A)", Agenda Item: 20.2.1, 3GPP TSG-RAN WG3 Meeting #82, R3-132101, San Francisco, USA, Nov. 11-15, 2013.
Ericsson: "Signalling procedures for dual connectivity", Agenda Item: 7.2.2.1, 3GPP TSG-RAN WG2 Meeting #84, R2-134219, San Francisco, USA, Nov. 11-15, 2013.
Extended European search report with supplementary European search report and the European search opinion issued by the European Patent Office for corresponding European Patent Application No. 14880684.7, dated Dec. 12, 2016.
3GPP TS36.300 V12.0.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", Dec. 2013.
3GPP TS36.211 V12.0.0, "3rd Generation Partnership Project; Technical Specification Group Radio Access Network; Evolved Universal Terrestrial Radio Access (E-Utra); Physical channels and modulation (Release 12)", Dec. 2013.
3GPP TS36.212 V12.0.0, "3rd Generation Partnership Project; Technical Specification Group Radio Access Network; Evolved Universal Terrestrial Radio Access (E-UTRA); Multiplexing and channel coding (Release 12)", Dec. 2013.
3GPP TS36.213 V12.0.0, "3rd Generation Partnership Project; Technical Specification Group Radio Access Network; Evolved Universal Terrestrial Radio Access (E-UTRA); Physical layer procedures (Release 12)", Dec. 2013.
3GPP TS36.321 V12.0.0, "3rd Generation Partnership Project; Technical Specification Group Radio Access Network; Evolved Universal Terrestrial Radio Access (E-UTRA); Medium Access Control (MAC) protocol specification (Release 12)", Dec. 2013.
3GPP TS36.322 V11.0.0, "3rd Generation Partnership Project; Technical Specification Group Radio Access Network; Evolved Universal Terrestrial Radio Access (E-UTRA); Radio Link Control (RLC) protocol specification (Release 11)", Sep. 2012.
3GPP TS36.323 V11.2.0, "3rd Generation Partnership Project; Technical Specification Group Radio Access Network; Evolved Universal Terrestrial Radio Access (E-UTRA); Packet Data Convergence Protocol (PDCP) specification (Release 11)", Mar. 2013.
3GPP TS36.331 V12.0.0, "3rd Generation Partnership Project; Technical Specification Group Radio Access Network; Evolved Universal Terrestrial Radio Access (E-UTRA); Radio Resource Control (RRC); Protocol specification (Release 12)", Dec. 2013.
3GPP TS36.413 V12.0.0, "3rd Generation Partnership Project; Technical Specification Group Radio Access Network; Evolved Universal Terrestrial Radio Access Network (E-UTRAN); S1 Application Protocol (S1AP) (Release 12)", Dec. 2013.
3GPP TS36.423 V12.0.0, "3rd Generation Partnership Project; Technical Specification Group Radio Access Network; Evolved Universal Terrestrial Radio Access Network (E-UTRAN); X2 application protocol (X2AP) (Release 12)", Dec. 2013.
Alcatel-Lucent et al., "Handover procedure in CA," Agenda Item: 7.1.5, 3GPP TSG-RAN WG2 Meeting #70, R2-103155, Montreal, Canada, May 11-15, 2010.
International Search Report issued for corresponding International Patent Application No. PCT/JP2014/000539, dated Jan. 31, 2014, with a partial English translation.
Notice of Preliminary Rejection issued by the Korean Intellectual Property Office for corresponding Korean Patent Application No. 10-2016-7021889, dated May 31, 2017, with English translation.
Decision of Refusal issued by the Japan Patent Office for corresponding Japanese Patent Application No. 2015-559615, dated Feb. 13, 2018, with an English translation.
European Office Action for corresponding European Patent Application No. 14880684.7, dated Mar. 15, 2018.
Notice of Last Preliminary Rejection issued by the Korean Intellectual Property Office for corresponding Korean Patent Application No. 10-2016-7021889, dated Jan. 10, 2018, with English translation.
First Notification of Office Action issued by the State Intellectual Property Office of China for corresponding Chinese Patent Application No. 201480074519.2, dated Sep. 30, 2018, with an English translation.
Notification of Reasons for Refusal issued by the Japan Patent Office for corresponding Japanese Patent Application No. 2015-559615, dated Apr. 23, 2019, with an English translation.
Second Notification of Office Action issued by the China National Intellectual Property Administration for corresponding Chinese Patent Application No. 201480074519.2, dated Apr. 12, 2019, with an English translation.
Summons to attend oral proceedings pursuant to Rule 115(1) EPC issued by the European Patent Office for corresponding European Patent Application No. 14880684.7-1214, dated Mar. 5, 2019.
Notice of Reasons for Refusal issued by the Japan Patent Office for corresponding Japanese Patent Application No. 2019-115540, dated Mar. 10, 2020, with an English machine translation.

(56) References Cited

OTHER PUBLICATIONS

First Notification of Office Action and search report issued by the China National Intellectual Property Administration for corresponding Chinese Patent Application No. 201910535991.6, dated Jan. 28, 2021, with an English machine translation.

* cited by examiner

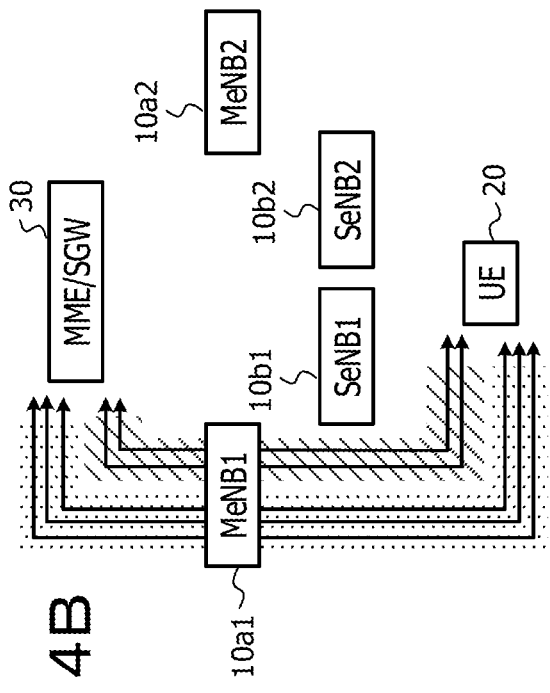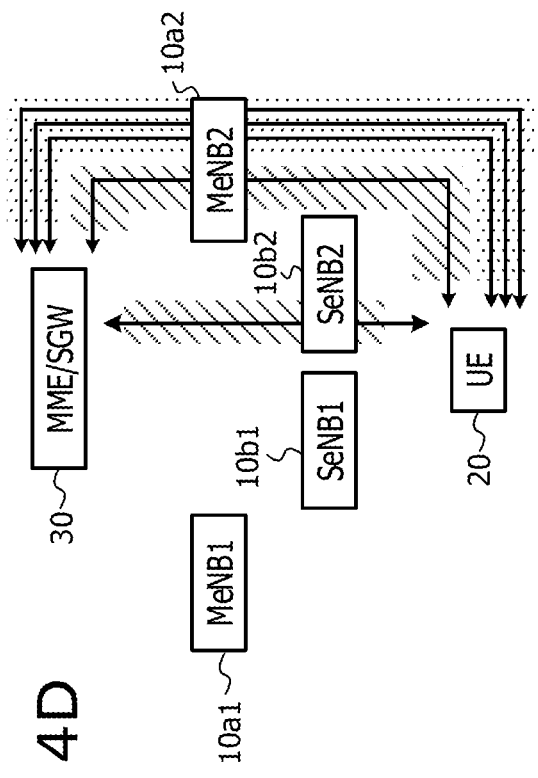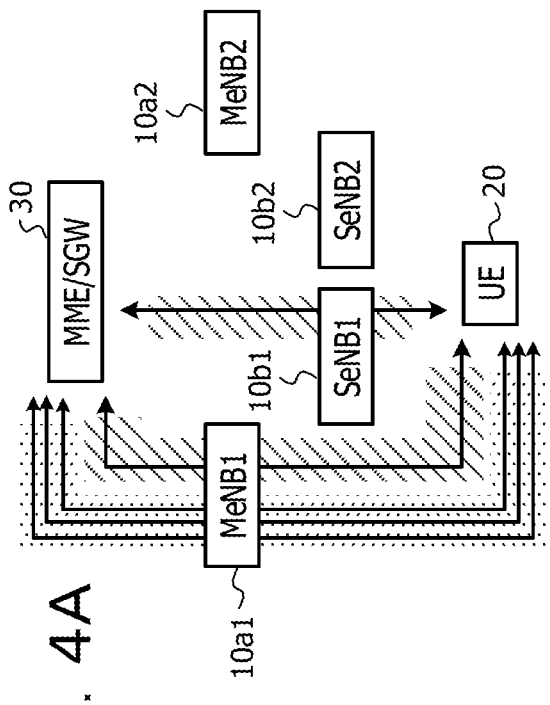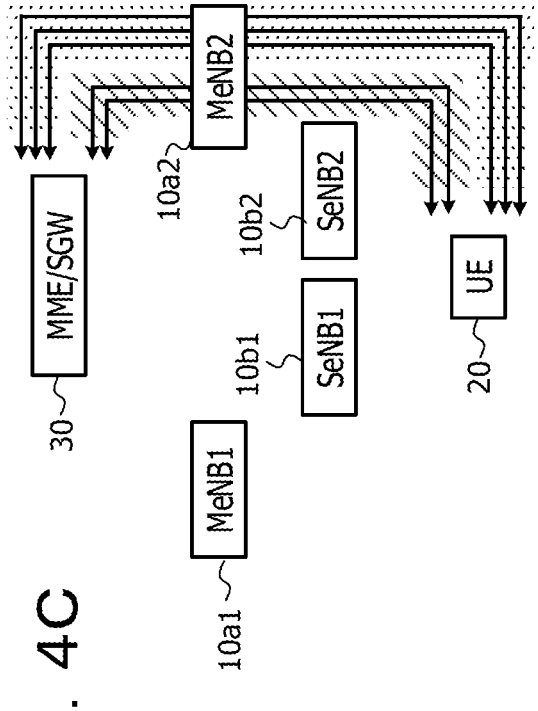
FIG. 4A
FIG. 4B
FIG. 4C
FIG. 4D

FIG. 8

| IE/Group Name | Presence |
|---|---|
| Message Type | M |
| Old eNB UE X2AP ID | M |
| Cause | M |
| Target Master Cell ID | M |
| Target Secondary Cell ID | O |
| Old Target Secondary Cell ID | O |
| GUMMEI | M |
| UE Context Information | |
| >MME UE S1AP ID | M |
| OMISSION OF MIDDLE PORTION | |
| >UE Security Capabilities | M |
| >AS Security Information | M |
| >UE Aggregate Maximum Bit Rate | M |
| >Subscriber Profile ID for RAT/Frequency priority | O |
| >E-RABs To Be Setup List | |
| >>Master E-RABs To Be Setup Item | |
| >>>E-RAB ID | M |
| >>>E-RAB Level QoS Parameters | M |
| >>>DL Forwarding | O |
| >>>UL GTP Tunnel Endpoint | M |
| >>Secondary E-RABs To Be Setup Item | |
| >>>E-RAB ID | O |
| >>>E-RAB Level QoS Parameters | O |
| >>>DL Forwarding | O |
| >>>UL GTP Tunnel Endpoint | O |
| OMISSION OF FOLLOWING PORTION | |

FIG. 9

| IE/Group Name | Presence |
|---|---|
| Message Type | M |
| Old eNB UE X2AP ID | M |
| New eNB UE X2AP ID | M |
| E-RABs Admitted List | |
| > Master E-RABs Admitted Item | |
| >>E-RAB ID | M |
| >>UL GTP Tunnel Endpoint | O |
| >>DL GTP Tunnel Endpoint | O |
| > Secondary E-RABs Admitted Item | |
| >>E-RAB ID | O |
| >>UL GTP Tunnel Endpoint | O |
| >>DL GTP Tunnel Endpoint | O |
| E-RABs Not Admitted List | O |
| Target eNB To Source eNB Transparent Container | M |
| Criticality Diagnostics | O |

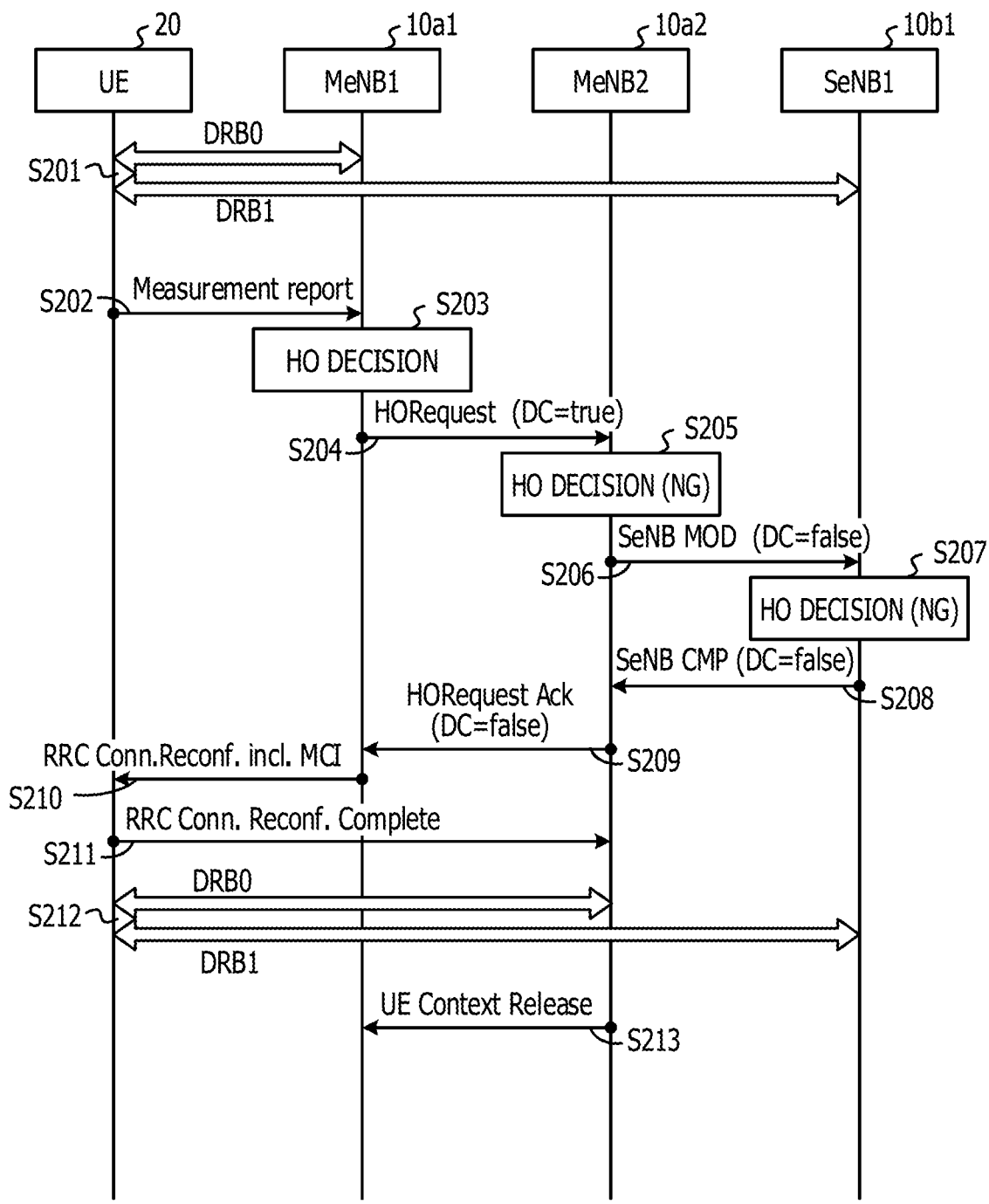

WIRELESS COMMUNICATION METHOD, WIRELESS COMMUNICATION SYSTEM, BASE STATION, AND WIRELESS STATION

CROSS-REFERENCE TO RELATED APPLICATION

This application is a continuation application of International Application PCT/JP2014/000539 filed on Jan. 31, 2014 and designated the U.S., the entire contents of which are incorporated herein by reference.

FIELD

The present invention relates to a wireless communication method, a wireless communication system, a base station, and a wireless station.

BACKGROUND

In recent years, a discussion on next generation wireless communication technologies has been performed to further enhance high-speed high-capacity wireless communication, and the like in a wireless communication system such as a portable phone system (cellular system). For example, communication standards called Long Term Evolution (LTE) and communication standards called LTE-Advanced (LTE-A) that is based on an LTE wireless communication technology have been proposed by the 3rd Generation Partnership Project (3GPP) that is a standard body.

A recently completed communication standard for 3GPP is Release 11 corresponding to LTE-A, which is an enhancement of Release 10 that is a major functional enhancement of Release 8 and Release 9 that correspond to LTE. At present, discussion on a main portion of Release 12 that is a further enhancement of Release 11 has been finished, and details are going to be edited toward the completion of Release 12. "LTE" is hereinafter defined as including other wireless communication systems that are enhancements of LTE, as well as LTE and LTE-A, unless otherwise specified.

Various technologies are included in 3GPP Release 12, and among them is a small cell. The small cell is a comparatively small cell, and is in contrast conceptually to a macro cell that is a comparatively large cell. While the macro cell is formed by a comparatively large wireless base station, the small cell is formed by a comparatively small wireless base station. At this point, the "cell" is a term indicating a range that a wireless base station covers in order for a wireless terminal to transmit and receive a wireless signal, but because the wireless base station and the cell conceptually correspond to each other, although the "cell" is suitably replaced with the "wireless base station" in the present specification, this poses no problem.

It is thought that, with introduction of the small cell, several effects are obtained. For example, the load on the macro cell can be reduced by setting up a small cell in a place, for example, such as a hot spot, where a large amount of communication occurs. Furthermore, for the wireless terminal, it is also expected that the transmission of a signal to a nearby small cell rather than a remote macro cell brings about an effect in which transmission power can be reduced and satisfactory communication performance can be obtained. It is thought that the small cell is an elemental technology which can solve various problems with a wireless communication system at present or in the future, and there is a consensus that active discussion on the small cell as a promising future technology in 3GPP will continue to be performed into the future.

Incidentally, in 3GPP, as one technology associated with the small cell, a study on dual connectivity has started. With the dual connectivity, the wireless terminal makes a connection to multiple wireless base stations and performs communication with each of the wireless base stations at the same time, and thus transmits or receives different information at the same time as each of the wireless base stations. To put it another way, with the dual connectivity, the wireless terminal can perform individual communication concurrently with each of the multiple wireless base stations.

FIG. 1 is a conceptual diagram of the dual connectivity. As illustrated in FIG. 1, as one example of the dual connectivity, for example, it is thought that, in a case where multiple small cells (cells that are formed by a small base station 10b) within the macro cell (cell that is formed by a macro base station 10a) are arranged, a wireless terminal 20 (user equipment (UE)) makes the connection to both of the macro cell and the small cell. Accordingly, for example, because it is possible that the wireless terminal 20 transmits and receives (individually communicates) different information between the macro cell and the small cell, it is possible that high-speed communication is realized. A discussion on the dual connectivity has just started in 3GPP, but because it is possible that an increase in speed capacity and the like that are indispensable for the future wireless communication system is realized, it is expected that a lot of discussion will be performed extensively into the future.

Moreover, the dual connectivity is described in the present application, but it goes without saying that the same discussion on multi-connectivity that is triple or more connectivity is also possible. For this reason, the dual connectivity may be assumed conceptually to include the multi-connectivity, and it is noted that the dual connectivity may be replaced with the multi-connectivity in the present application.

CITATION LIST

Non Patent Literature

NPL 1: 3GPP TS36.300 V12.0.0 (2013-12)
NPL 2: 3GPP TS36.211 V12.0.0 (2013-12)
NPL 3: 3GPP TS36.212 V12.0.0 (2013-12)
NPL 4: 3GPP TS36.213 V12.0.0 (2013-12)
NPL 5: 3GPP TS36.321 V12.0.0 (2013-12)
NPL 6: 3GPP TS36.322 V11.0.0 (2012-09)
NPL 7: 3GPP TS36.323 V11.2.0 (2013-03)
NPL 8: 3GPP TS36.331 V12.0.0 (2013-12)
NPL 9: 3GPP TS36.413 V12.0.0 (2013-12)
NPL 10: 3GPP TS36.423 V12.0.0 (2013-12)
NPL 11: 3GPP TR36.842 V12.0.0 (2013-12)

SUMMARY

According to an aspect of the invention, a wireless communication method includes when a wireless station has dual connectivity to a first base station that is a primary base station for the wireless station and a second base station that is a secondary base station for the wireless station and when a handover of the primary base station for the wireless station is to be performed from the first base station to a third base station, transmitting from the first base station to the third base station a first signal requesting the handover, when the third base station makes a determination not to change the secondary base station for the wireless station based on the first signal, transmitting from the third base station to the second base station a second signal indicating the determination, transmitting from the third base station to the first base station a third signal indicating the determination, and performing the handover based on the third signal without transferring a connection between the wireless station and the second base station to the first base station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 4A, 4B, 4C & 4D are diagrams for describing one example of problem identification.

FIG. 8 is a diagram illustrating one example of a HO Request message according to the second embodiment.

FIG. 9 is a diagram illustrating one example of a HO Request ACK message according to the second embodiment.

FIG. 10 is a diagram illustrating one example of a second processing sequence according to the second embodiment.

DESCRIPTION OF EMBODIMENTS

Figure 1:
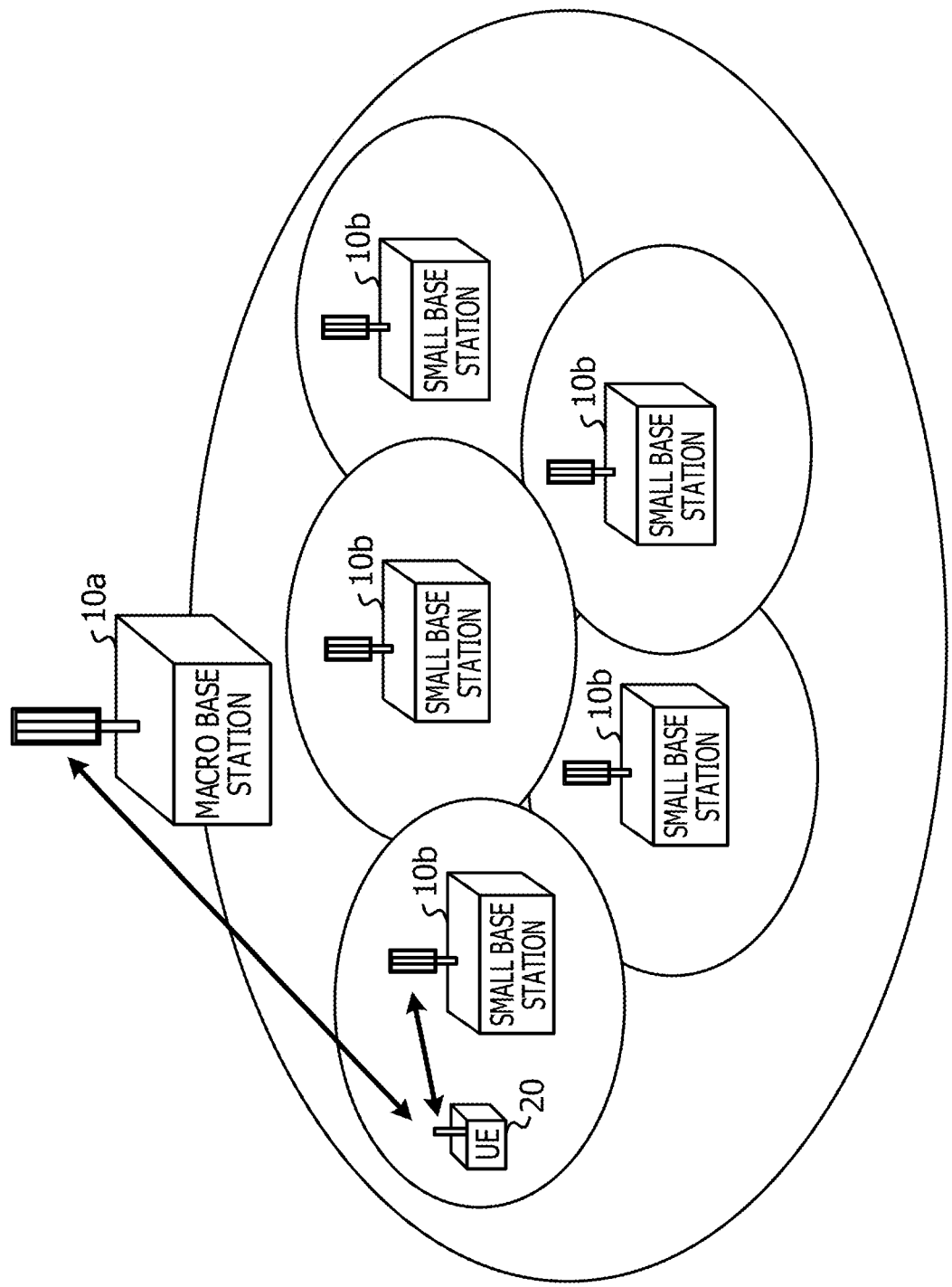
FIG. 1 is a diagram illustrating a concept of dual connectivity.

As described above, the discussion on the dual connectivity that is based on the small cell and the like has just started in 3GPP, and the dual connectivity has not yet been discussed in great depth. For this reason, it is thought that, in a case where the dual connectivity is introduced for an LTE system and the like, there is a likelihood that a certain problem or inconvenience that is not known to the world will occur. Particularly, a discussion on mobile control of the terminal that makes the dual connectivity has barely been made so far. Therefore, a mechanism for the mobile control that is desirable for realizing the dual connectivity that is based on the small cell and the like has not been present in the related art.

Moreover, the above-described problems are described based on the small cell in the LTE system, but the problems can further be found in a general cell that also includes the small cell. That is, the mechanism for the mobile control that is desirable for realizing the dual connectivity of the wireless terminal to multiple cells has not been known in the LTE system in the related art.

An object of the disclosed technology, which is contrived in view of the above-described problems, is to provide a wireless communication method, a wireless communication system, a base station, and a wireless station, in all of which desirable mobile control can be performed in a case where dual connectivity is realized.

A wireless communication method, a wireless communication system, a wireless base station, and a wireless station according to embodiments will be described below for disclosure, referring to the drawings. Moreover, for convenience, descriptions are provided according to individual embodiments, but it goes without saying that combinations of the embodiments can bring out combination effects and an increase in utility.

[Problem Identification]

First, a problem with a technology in the related art is described before each of the embodiments is described. This problem was newly found as a result of the inventor's in-depth study on the technology in the related art, and it is noted that the problem had not been known before that.

Moreover, in an LTE system, generally, a wireless terminal 20 and a base station 10 (a wireless base station 10) are referred to as a user equipment (UE) and an evolved NodeB (eNB), respectively. Furthermore, it is noted that the wireless terminal 20 in the present application can generally be referred to as a wireless station. The wireless station can include a wireless communication device that can perform wireless communication with the base station 10.

As described above, a discussion on a dual connectivity in 3GPP has just started. For this reason, in the LTE system in the related art, mobile control is not known that is desirable for the wireless terminal 20 to realize the dual connectivity with multiple cells. More specifically, in the LTE system in the related art, a particular procedure or the like for handover for the wireless terminal 20 that performs the dual connectivity is not prescribed.

The handover here is processing that switches a certain base station 10 to which the wireless terminal 20 has a connection in a case where the wireless terminal 20 that has the connection to the certain base station 10 moves out of a cell that is constituted by the certain base station 10. The handover can be said to be one of fundamental technologies for performing the mobile control of the wireless terminal 20 in the wireless communication system. There are several types of handovers in the LTE system, but an example of an X2 handover that is the most general handover will be described below. However, the handovers in the present application are not limited to the X2 handover, but may include other handovers in terms of concept. For example, the handovers in the present application can include an S1 handover that is performed in a case where the X2 handover is impossible to support.

Moreover, in a situation where, as illustrated in FIG. 1, a macro base station 10a and a small base station 10b are present in a mixed manner, it is noted that the handover described above is performed between the wireless terminal 20 and the macro base station 10a (a macro cell). The switching of the small base station 10b to which the wireless terminal 20 has a connection is performed following the movement of the wireless terminal 20, but it is assumed that this is performed based on a different mechanism from the handover described over. For example, the switching of the small base station 10b is possible to perform based on a mechanism similar to switching of a carrier in carrier aggregation (CA), but a detailed description thereof is omitted.

Returning to the original subject, as is described above, in the LTE system in the related art, a particular procedure for the handover for the wireless terminal 20 that has the dual connectivity is not known. Accordingly, it will be considered below that with a focus on this, the handover for the wireless terminal 20 that has the dual connectivity can be realized without a hitch, by using a technology that is already stipulated in the LTE system in the related art.

First, the carrier aggregation (CA) that is a technology that is stipulated in the LTE system in the related art is described. The carrier aggregation can realize high speed large capacity communication by in a bundled manner using multiple component carriers (CC) that are frequency bands which are used for communication between the wireless base station 10 and the wireless terminal 20. A bandwidth that is supported in the LTE system is limited to a maximum of 20 MHz, but with the carrier aggregation, for example, a bandwidth of 40 MHz can be used by bundling two CCs of 20 MHz. The carrier aggregation is one of the elemental technologies that are introduced with 3GPP Release 10.

Plainly speaking, with the carrier aggregation, a single base station 10 and the wireless terminal 20 perform different wireless communications using multiple component carriers in parallel. On the other hand, the dual connectivity described above, multiple base stations 10 and the wireless terminal 20 perform different wireless communications in parallel. Therefore, there is a big difference between the carrier aggregation and the dual connectivity in that one base station 10 is involved in the carrier aggregation and multiple base stations 10 are involved in the dual connectivity. However, there is in common that one wireless terminal 20 performs multiple different wireless communications in parallel, and thus the carrier aggregation and the dual connectivity can also be thought to be technologies similar to each other.

Incidentally, the carrier aggregation, as described above, is the elementary technology that is introduced 3GPP Release 10, and a procedure for the handover is already established. Accordingly, consideration is set to be given to whether or not the handover for the wireless terminal 20 that has the dual connectivity can be realized without a hitch using the procedure for the handover for the wireless terminal 20 that is involved in the carrier aggregation. For convenience in the present application, a handover procedure for the dual connectivity that uses the handover procedure for such a carrier aggregation is set to be referred to as a "reference technology".

First, as a preparation for considering the reference technology, the connection between the wireless terminal 20 and the base station 10 in the LTE system will be described below and then the dual connectivity in a case where the macro base station 10a and the small base station 10b is present in a mixed manner will be described. Furthermore, an arrangement of the macro base station 10a and the small base station 10b will also be described.

A connection between the wireless base station 10 and the wireless terminal 20 in the LTE system will be described. At this point, the connection by the wireless terminal 20 to the wireless base station 10 is defined as indicating a state where data communication is possible between the wireless terminal 20 and the wireless base station 10 by the wireless terminal 20 achieving synchronization with the wireless base station 10 and completing an indispensable configuration. In the LTE system, a radio resource control (RRC) that is a function for connection management is stipulated, and such a connection state is referred to as RRC_CONNECTED. On the other hand, a state where the wireless terminal 20 does not have the connection to the wireless base station 10 is referred to as RRC_IDLE.

In the LTE system, when the wireless terminal 20 has the connection to the wireless base station 10 (when the wireless terminal 20 is in an RRC_CONNECTED state), the wireless terminal 20 can perform data communication through a data channel. As the data channel in the LTE system, an uplink physical shared channel that is an uplink data channel and a downlink physical shared channel that is a downlink data channel are stipulated. These pieces of data channel are attached when transmitting and receiving so-called user data, and are also used transmission and reception of control data such as an RRC signal (an L3 signal).

A logical communication path that is constructed from multiple layers is established on such a data channel between the wireless terminal 20 and the wireless base station 10. The logical communication path (a connection) is referred to as a bearer. In bearers, different data communication (including the user data and the control data) are performed, respectively. At this point, it is noted that "different data communication" means not only that physical wireless signals are simply different, but also that data contents (which are equivalent to contents of data and in other words, can be said to be pre-modulation or post-demodulation data contents) themselves are different.

In the LTE system, two types of a signaling radio bearer (SRB) that is a control bearer and a data radio bearer (DRB) that is a data bear are stipulated. The SRB corresponds to a so-called control plane that is referred to as a control plane (C-Plane), and is the logical communication path that is used for the transmission and reception of the RRC signal and the like. The DRB corresponds to a so-called user plane (a data plane) that is referred to as a user plane (U-Plane), and is the logical communication path that is used for the transmission and reception of the user data. At this point, the plane is interpreted as being equivalent to a bundle of bearers in terms of conception.

Consecutively, the dual connectivity in a case where the macro base station 10a and the small base station 10b are present in a mixed manner is described. In the case of the macro base station 10*a* and the small base station 10*b* are present in a mixed manner, if the wireless terminal 20 makes a connection to the wireless base station 10, the wireless terminal 20 first makes a connection to the macro base station 10*a* (the RRC_CONNECTED state). At this time, the control bearer is configured on the data channel (a PUSCH in the case of uplink or a PDSCH in the case of downlink) between the wireless terminal 20 and the macro base station 10*a*, and the control plane is in a connected state. Furthermore, data bearer is configured on the data channel between the wireless terminal 20 and the macro base station 10*a*, and the user plane is in a connected state.

At this point, a detailed description of the control bearer is omitted, but three types of control bearers, SRB 0, SRB 1, and SRB 2 are stipulated in the LTE system. Furthermore, the data bearer is configured at least one time at the start, and thereafter, if need arises, addition or deletion is performed. In the LTE system, it is possible that a maximum of 11 data bearers is configured for one wireless terminal 20.

After the wireless terminal 20 makes a connection to the macro base station 10*a*, the macro base station 10*a*, if need arises, can cause the wireless terminal 20 to make the dual connectivity. For example, in a case where a wireless state between the small base station 10*b* and the wireless terminal 20 is satisfactory, the macro base station 10*a* can cause the wireless terminal 20 to make a connection to the small base station 10*b* while the wireless terminal 20 maintains the connection to the macro base station 10*a*. Accordingly, the wireless terminal 20 is in a state where the wireless terminal 20 makes the dual connectivity to the macro base station 10*a* and the small base station 10*b*. When the wireless terminal 20 starts the dual connectivity, for example, the wireless terminal 20 can reliably make a call through the macro base station 10*a*, and can receive a streaming from the small base station 10*b*.

At this time, only data plane is connected on the data channel (the PUSCH in the case of the uplink or the PDSCH in the case of the downlink) between the wireless terminal 20 and the small base station 10*b*, and only data bearer is configured. Connection of the control plane or configuration of the control bearer is not performed between the wireless terminal 20 and the small base station 10*b*. This depends on the stipulation of only one RRC for the wireless terminal 20 in the LTE system.

Therefore, for the wireless terminal 20 that has the dual connectivity, the control bearer and the data bearer are configured on the data channel between the wireless terminal 20 itself and the macro base station 10*a*, and the control plane and the user plane is connected to the wireless terminal 20. Furthermore, for the wireless terminal 20 that has the dual connectivity, only data bearer is configured on the data channel between the wireless terminal 20 itself and the small base station 10*b*, and only the user plane is connected to the wireless terminal 20. However, it is possible that the number of user planes is also set to 1 in the wireless terminal 20 that has the dual connectivity. For example, it is possible that, in the wireless terminal 20 that has the dual connectivity, the connection of the user plane and the configuration of the data bearer is also set to be performed only between the wireless terminal 20 itself and the base station 10*b*.

Figure 2:
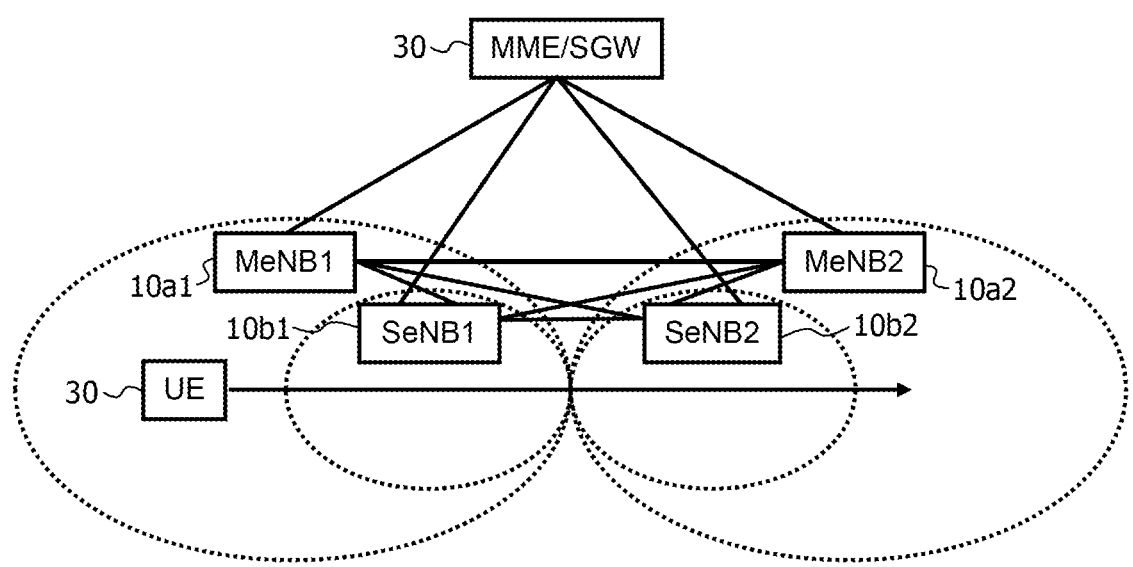
FIG. 2 is a diagram illustrating one example of installation of a base station.
Figure 3:
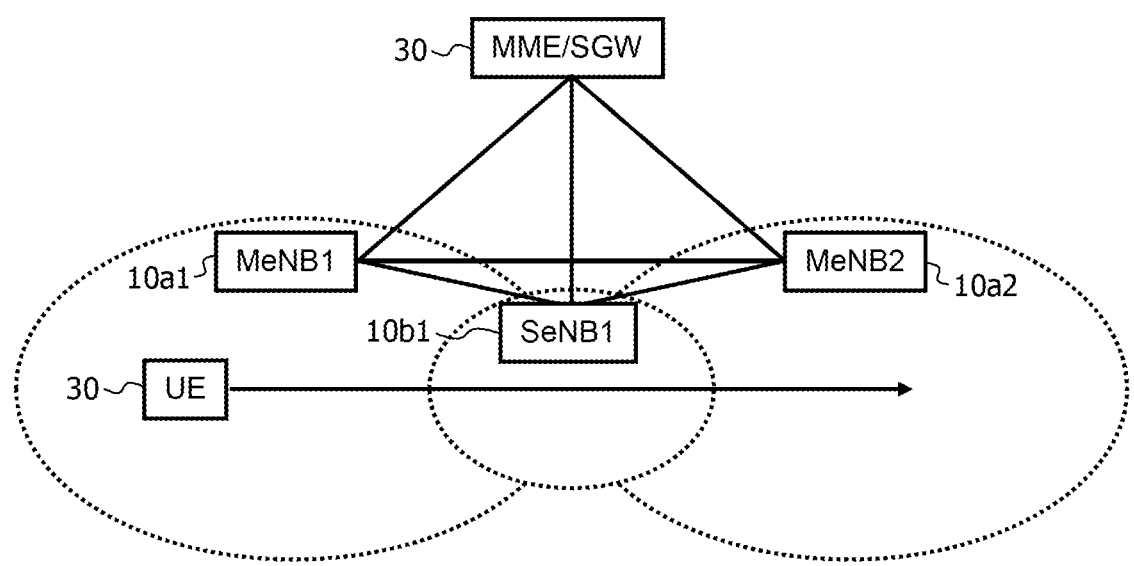
FIG. 3 is a diagram illustrating another example of the installation of the base station.

Last, the arrangement of the macro base station 10*a* and the small base station 10*b* is described referring to FIGS. 2 and 3. FIG. 2 illustrates one example of the arrangement of the macro base station 10*a* and the small base station 10*b*. FIG. 2 illustrates a mobility management entity (MME) and a serving gateway (SGW) 30 that are higher devices, a first micro base station 10*a*1 (MeNB1) and a second macro base station 10*a*2 (MeNB2) that are two macro base stations 10*a* (Macro evolved nodeBs (MeNBs)), a first small base station 10*b*1 (SeNB1) and a second small base station 10*b*2 (SeNB2) that are two small base stations 10*b* (Small evolved nodeBs (SeNBs)), and the wireless terminal 20 (user equipment (UE)). The MME is an entity that performs mobile management in the LTE system, and functions as a termination device of the control plane. The SGW is one of the entities that provide a gateway function between the SGW itself and a higher network in the LTE system, and functions as a termination device of the data plane. Moreover, in FIG. 2 and other figures, an interface between each base station 10 is referred to as an X2 interface, and an interface between each base station 10 and a higher apparatus is referred to an S1 interface.

In FIG. 2, it is assumed that the first macro base station 10*a*1 and the second macro base station 10*a*2 are adjacent to each other. Then, it is assumed that cells that are constituted by the first macro base station 10*a*1 include cells that are constituted by the first small base station 10*b*1. Furthermore, it is assumed that cell that are constituted by the second macro base station 10*a*2 include cells that are constituted by the second small base station 10*b*2. Additionally, it is assumed that the first small base station 10*b*1 and the second small base station 10*b*2 are also adjacent to each other. In a typical case where the macro base station 10*a* and the small base station 10*b* are present in a mixed manner, it is considered that the small base station 10*b* is subordinate to one macro base station 10*a*. FIG. 2 illustrates such a case. Moreover, because, as described above, the dual connectivity is made under the management of the macro base station 10*a*, in the case in FIG. 2, the macro base station 10*a* can sequentially know situations (a congestion level and the like) of the small base station 10*b* that is under the control.

In contrast, in FIG. 3, another example of the arrangement of the macro base station 10*a* and the small base station 10*b* is illustrated. FIG. 3 illustrates the MME and the SGW 30 that are the higher devices, the first macro base station 10*a*1 (MeNB1) and the second macro base station 10*a*2 (MeNB2) that are the two macro base stations 10*a*, the first small base station 10*b*1 (SeNB1) that is one small base stations 10*b*, and the wireless terminal 20 (UE). FIG. 3, when compared with FIG. 2, is different in terms of the arrangement and the number of small base stations 10*b*.

It is assumed that, in FIG. 3, the first macro base station 10*a*1 and the second macro base station 10*a*2 are also adjacent to each other. Then, it is assumed that a cell that is constituted by the small base station 10*b*, as illustrated in FIG. 3, extends across the cell that is constituted by the first macro base station 10*a*1 and the cell that is constituted by the second macro base station 10*a*2. In the case where the macro base station 10*a* and the small base station 10*b* are present in a mixed manner, it is thought that a cell edge of the macro base station 10*a* by installing the small base station 10*b*, as illustrated in FIG. 3. For this reason, it is thought that an operator (a communications carrier) who the installation (a cell design) of the base station 10 as illustrated in FIG. 3 is also certainly assumed to appear in the future. Moreover, in the case of FIG. 3, because multiple macro base stations 10*a* are made to manage the small base station 10*b*, it is indispensable for the macro base station 10*a* to exchange pieces of information between the macro base station 10*a* itself and the base station 10 in order to know the situations (the congestion level and the like) of the small base station 10*b*.

Based on the description so far, the reference technology (the handover procedure for the dual connectivity, which uses the handover procedure for the carrier aggregation) will be described below.

FIG. 4 illustrate a case where the reference technology is applied to the installation of the base station 10 in FIG. 2. On the other hand, FIG. 5 illustrate a case where the reference technology is applied to the installation of the base station 10 in FIG. 3. Because all of this application is performed according to the same procedure, at this point, the reference technology is described based on FIG. 5.

Figure 5A:
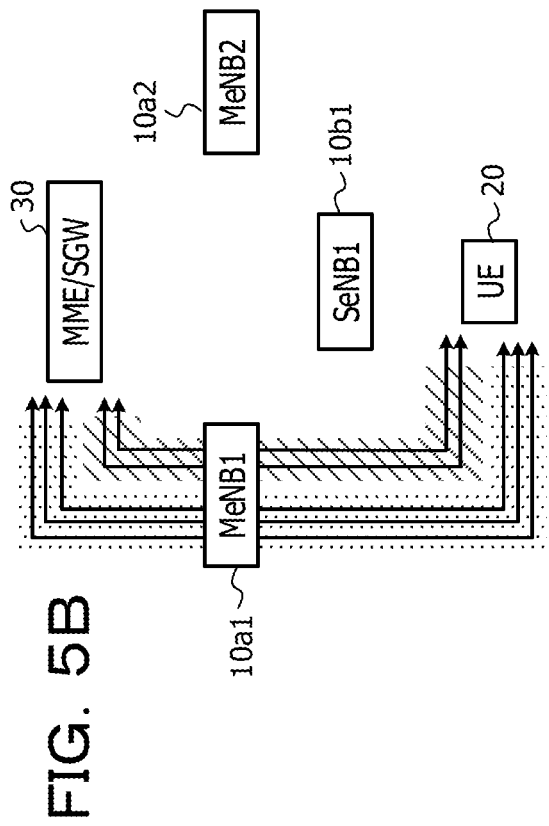
FIGS. 5A, 5B, 5C & 5D are diagrams for describing another example of problem identification.

As illustrated in FIG. 5A, first, the wireless terminal 20 makes the dual connectivity to the first macro base station 10a1 and the first small base station 10b1. At this time, the wireless terminal 20 is the RRC_CONNECTED state between the wireless terminal 20 and the first macro base station 10a1, and, the control plane and the user plane are connected on the data channel (the PUSCH in the case of the uplink or the PDSCH in the case of the downlink) between the wireless terminal 20 and the first macro base station 10a1. In FIGS. 5A to 5D and other similar figures, a dot hatching indicates the control plane and, an oblique-line hatching indicates the user plane.

Furthermore, at this point, as one example, it is assumed that SRB 0, SRB 1, and SRB 2 that are three control bearers are configured for the control plane on the data channel between the wireless terminal 20 and the first macro base station 10a1, and that DRB 0 that is one data bearer is configured for the user plane between the wireless terminal 20 and the first macro base station 10a1. In FIGS. 5A to 5D and other similar figures, an arrow indicates a bearer (the control bearer or the data bearer). Moreover, it is noted that each plane and each bearer are connected bidirectionally between the wireless terminal 20 and the MME/SGW 30 (it is noted that a division appears to be performed with each base station 10, but this is actually not true).

On the other hand, the user plane is connected on the data channel (the PUSCH in the case of the uplink or the PDSCH in the case of the downlink) between the wireless terminal 20 and the first small base station 10b1. At this point, as one example, DRB 1 that is one data bearer is configured for the user plane between the wireless terminal 20 and the first small base station 10b1. Moreover, it is a design matter which data bearer the macro base station 10a forces out to the small base station 10b, but for example, it is thought that the data bearer for which large capacity and immediacy are indispensable as in the streaming is transferred to the small base station 10b. For example, it is assumed that DRB 1 is such a data bearer.

At this point, it is assumed that the first macro base station 10a1 causes the wireless terminal 20, which has the dual connectivity, to perform handover to the second macro base station 10a2. The first macro base station 10a1, for example, can make the decision of the handover based on the measurement report or the like that is received periodically from the wireless terminal 20.

At this point, it is problematic how the data bearer that is configured between the wireless terminal 20 and the first small base station 10b1 is handled based on the decision of the handover. First, as one proposal, it is thought that all the data bearers that are configured between the wireless terminal 20 and the first small base station 10b1 are also handed over without any change to the second macro base station 10a2 (a handover destination). However, at this stage, because the control plane of the wireless terminal 20 is still the first macro base station 10a1 (a handover source), it is thought that this is not realistic.

Figure 5B:
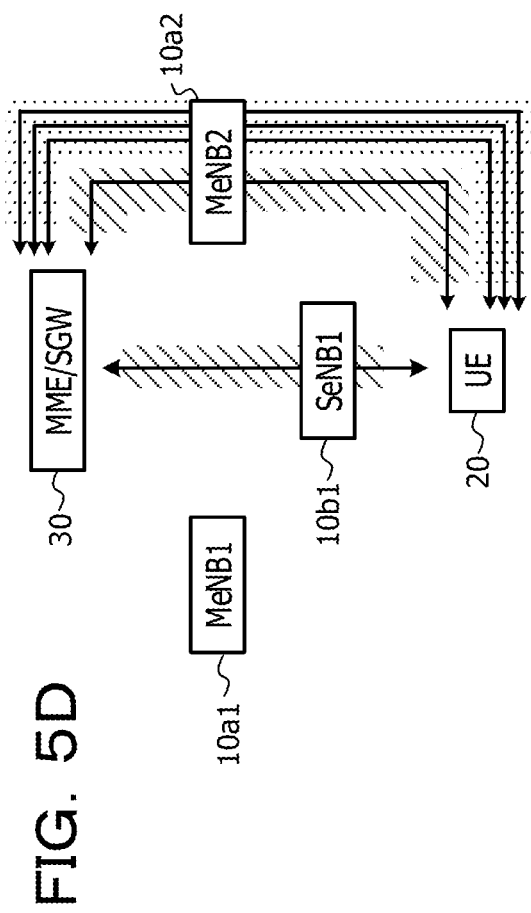

Accordingly, at this point, as illustrated in FIG. 5B, based on the decision of the handover, the first macro base station 10a1 temporarily hands over all the data bearers that are configured between the wireless terminal 20 and the first small base station 10b1. Accordingly, the dual connectivity in the wireless terminal 20 is temporarily ended, and the wireless terminal 20 is in a state of being connected only to the first macro base station 10a1.

Incidentally, as described above, the reference technology that is illustrated in FIG. 5 complies with the existing handover procedure for the carrier aggregation described above, but, particularly, follows the existing handover procedure in FIG. 5B. Specifically, at the time of the handover, the wireless terminal 20 that is involved in the carrier aggregation temporarily hands over all the data bearers that are configured for a secondary cell (SCell) in which a primary cell (PCell) that is a primary carrier is a secondary carrier. Based on this model, the first macro base station 10a1 in FIG. 5B temporarily hands over all the data bearers that are configured for the first small base station 10b1.

Returning to the description that is provided referring to FIG. 5, the first macro base station 10a1 in FIG. 5B hands over DRB 1 that the data bearer that is connected between the wireless terminal 20 and the first small base station 10b1. Accordingly, all the control bearers and data bearers that are configured for the wireless terminal 20 are aggregated through the first macro base station 10a1, and involve the data channel between the first macro base station 10a1 and the wireless terminal 20. Furthermore, as a result, as illustrated in FIG. 5B, the control plane and the user plane to which the wireless terminal 20 makes a connection are aggregated through the first macro base station 10a1. Accordingly, SRB 0, SRB 1, and SRB 2 that are three control bearers are configured for the control plane on the data channel between the wireless terminal 20 and the first macro base station 10a1, and DRB 0 and DRB 1 that are two data bearers are in a state of being configured for the user plane between the wireless terminal 20 and the first macro base station 10a1.

Figure 5C:
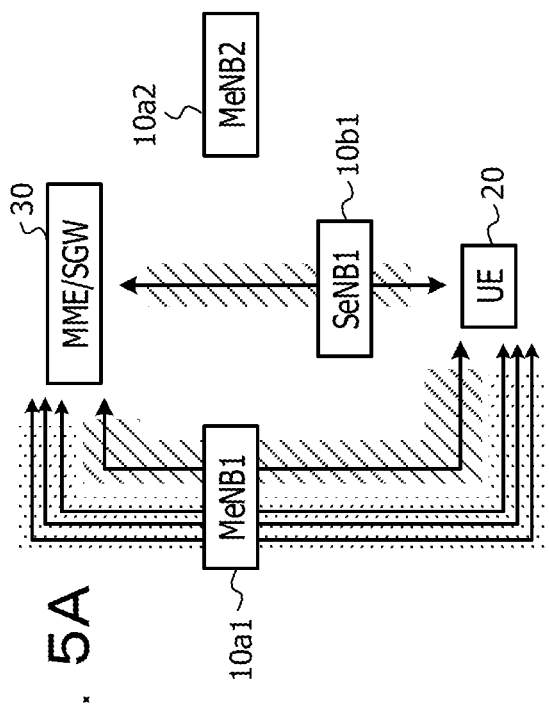

Next, as illustrated in FIG. 5C, the wireless terminal 20 performs the handover from the first macro base station 10a1 to the second macro base station 10a2. Accordingly, the wireless terminal 20 is in the RRC_CONNECTED state between the wireless terminal 20 itself and the second macro base station 10a2, and the control plane and the user plane are connected on the data channel (the PUSCH in the case of the uplink or the PDSCH in the case of the downlink) between the wireless terminal 20 and the second macro base station 10a2.

At this time, the first macro base station 10a1 notifies the second macro base station 10a2 of information indicating various attributes (parameters, such as an ID of the data bearer and a service level in the data bearer) relating to all the data bears (specifically, DRB 0 and DRB 1) that are configured on the data channel between the wireless terminal 20 and the first macro base station 10a1. Accordingly, the second macro base station 10a2 hands over DRB 0 and DRB 1. Furthermore, the control bearers (specifically, SRB 0, SRB 1, and SRB 2) are newly configured on the data channel between the second macro base station 10a2 and the wireless terminal 20. Accordingly, SRB 0, SRB 1, and SRB 2 that are three control bearers are configured for the control plane on the data channel between the wireless terminal 20 and the second macro base station 10a2, and DRB 0 and DRB 1 that are two data bearers are in a state of being configured for the user plane between the wireless terminal 20 and the second macro base station 10a2.

The handing over of DRB 0 and DRB 1 that are two data bearers which are configured between the wireless terminal 20 and the first macro base station 10a1 is described more exactly. With the procedure at the time of the handover, the wireless terminal 20 and the second macro base station 10a2 are in the RRC_CONNECTED state, and the control plane and the data plane are connected through the data channel (the PUSCH in the case of the uplink and the PDSCH in the case of the downlink). DRB 0 and DRB 1 are handed over to the data channel between the wireless terminal 20 and the second macro base station 10a2.

At this point, the data bearer (DRB 0 and DRB 1) are described as being handed over from the first macro base station 10a1 to the second macro base station 10a2, but it is noted that the handing over means handing over various attributes (parameters such as the ID of the data bearer and the service level in the data bearer) that are configured, with a comparatively higher layer, for the data bearer. In contrast, according to specifications of the LTE system in the related art, re-establishment is performed on each bearer (the data bearer and the control bearer) at the time of the handover in a comparatively lower layer (specifically, a PDPC layer or an RLC layer that is equivalent to L2) for a wireless connection.

Next, it is assumed that the second macro base station 10a2 determines that the dual connectivity by the wireless terminal 20 is started. Furthermore, it is assumed that the second macro base station 10a2 determines that a connection destination which is added to the wireless terminal 20 for the dual connectivity is the first small base station 10b1. That the wireless terminal 20 has the connection to the first small base station 10b1 immediately before the handover (FIG. 5A) means that wireless quality between the first small base station 10b1 and the wireless terminal 20 is comparatively satisfactory. For this reason, it is inferred that this decision by the second macro base station 10a2 is a natural flow.

Moreover, the second macro base station 10a2, for example, can make the decision based on the measurement report or the like that is received periodically from the wireless terminal 20. Furthermore, it is thought that the second macro base station 10a2 makes the decision, for example, based on a handover request of the first macro base station 10a1 or the like.

Figure 5D:
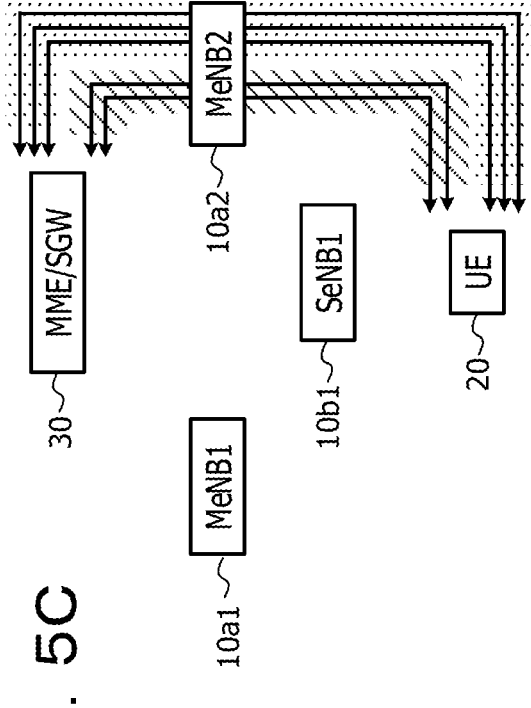

Based on the decision of starting the dual connectivity, as illustrated in FIG. 5D, the wireless terminal 20 starts the dual connectivity. As described above, only data plane is connected on the data channel (the PUSCH in the case of the uplink or the PDSCH in the case of the downlink) between the wireless terminal 20 and the first small base station 10b1 at the time of the dual connectivity. At this point, it is assumed that as one example, among two data bearers that are configured for the second macro base station 10a2 itself, the second macro base station 10a2 in FIG. 5D transfers DRB 1 to the first small base station 10b1. As described above, if it is assumed that, for example, DRB 1 is the data bearer for which the large volume and the immediacy are indispensable, it is inferred that the transfer of this to the small base station 10b is a natural flow.

As a result of transferring the data bearer, DRB 1 that is one data bearer is configured for the user plane on the data channel between the wireless terminal 20 and the first small base station 10b1. On the other hand, SRB 0 to SRB 2 that are three control bearers are configured for the control plane on the data channel between the wireless terminal 20 and the second macro base station 10a2, and DRB 0 that is one data bearer is configured for the user plane.

A procedure for the reference technology is as described above. As described above, the reference technology performs the handover for the dual connectivity using the existing handover procedure for the carrier aggregation. Therefore, with the reference technology, it is thought that the handover for the dual connectivity can also be realized without a hatch, using the existing handover procedure for the carrier aggregation. Therefore, when the reference technology is considered, it is thought that the following problems are present.

With the reference technology, as illustrated in FIG. 5, in the wireless terminal 20 that performs the dual connectivity, the data bearer that are at first configured for the first small base station 10b1 (FIG. 5A) are temporarily aggregated to the first macro base station 10a1 (FIG. 5B). Then, thereafter, with the handover, the data bearer is handed over to the second macro base station 10a2 (FIG. 5C), and the data bearer is transferred to the first small base station 10b1 (FIG. 5D).

At this point, when a focus is placed on the data bearer that is configured for the first small base station 10b1 at the initial stage (FIG. 5A), although the initial stage and the final stage (FIG. 5D) are the same, it is understood that the handing over is performed in middle stages (FIGS. 5B to 5C). Therefore, in the reference technology, it is thought that it is possible that redundant processing is also interpreted as being performed at the time of the handover on the data bearer that is configured for the data bearer in the small base station 10b at a pre-handover stage.

In this manner, when the redundant processing is performed at the time of the handover, this is not desirable because the handover takes the time and a concern, such as instantaneous disconnection, increases. Furthermore, the redundant processing also leads to performing of the originally unnecessary processing load or signaling. It is thought that this is not also desirable for the base station 10 and for the wireless terminal 20.

Moreover, the identification of the problems is described above, mainly referring to FIG. 5, but it is possible that the identification of the problems is also described in almost the same manner referring to FIG. 4. However, unlike in FIG. 5, because two small base stations 10b are involved in FIG. 4, the data bearers that are configured for the small base station 10b in the initial stage (FIG. 4A) and the final stage (FIG. 5D) are not necessarily the same. For this reason, in an example in FIG. 4, although a latent problem is not large compared with an example in FIG. 5, there is in common that there are redundant portions in the handover processing, and it can be said that the example in FIG. 4 has the same problem as the example in FIG. 5.

Furthermore, the description is provided above based on the dual connectivity to the macro base station 10a (the macro cell) and the small base station 10b (the small cell) in the LTE system. However, but the application scope of the invention in the present application is not to this, and it is noted that the dual connectivity can be extensively connected to the general base station 10 (cell). For example, it is possible that the invention in the present application, of course, is applied to a master cell and a slave cell, an anchor cell and an assisting cell, a primary cell and a secondary cell, and the like. Additionally, it is noted that in the present application, a way of naming each cell (the base station 10) is not limited to this. Generally, as in the LTE system in the related art, if the base station 10 that performs the communication in which both of the control plane and the data plane are connected is a primary base station 10 and the base station 10 that performs the communication by additionally connecting the data plane is a secondary base station 10, various terms can be used within the scope that does not depart from this intention. For example, the recent standardization trend is that a combination of the dual connectivity and the carrier aggregation is possible, and is that a cell group which provides a primary communication resource is referred to as a "master cell group (MCG)" and a cell group which provides an additional communication resource is referred to as a "secondary cell group (SCG)".

In addition, as an example, the LTE system is described above, it is noted that the above-described problems are not necessarily limited to the LTE systems. That is, the above-described problems, if only a condition is satisfied, occur in an arbitrary wireless communication system.

In summary, as one example, it is thought that the existing handover procedure for the carrier aggregation is used as a procedure in a case where the wireless terminal 20 that has the dual connectivity to the macro base station 10a and the small base station 10b in the LTE system performs the handover to a separate macro base station 10a (the reference technology described above). However, it is thought that with the related reference technology, the redundant processing is performed at the time of the handover and the concern, such as the instantaneous disconnection, also increases. As described above, this problem was newly found as a result of the inventor's in-depth study on the technology in the related art, and has not been known in the related art. Embodiments in the present application, which are to solve a problem that accompanies the handover at the time of the dual connectivity, will be described sequentially below.

First Embodiment

According to a first embodiment, there is provided a wireless communication method in which a wireless station (for example, the wireless terminal 20) that performs first data communication (for example, the DRB 0 that is the data bearer) through a first base station 10 (for example, the first macro base station 10a1) and a first communication channel (for example, the PDSCH or the PUSCH that are data channels between the first macro base station 10a1 and the wireless terminal 20) performs second data communication (for example, DRB 1 that is the data bearer), which is different from the first data communication, through a second base station 10 (for example, the first small base station 10b1) and a second communication channel (for example, the PDSCH or the PUSCH that are the data channels between the first small base station 10b1 and the wireless terminal 20), concurrently with the first data communication, and in which, in a case where the first base station 10 causes the wireless station to perform the handover from the first base station 10 to a third base station 10 (for example, the second macro base station 10a2), the first base station 10 hands over the first data communication to a third communication channel (for example, the PDSCH or PUSCH that is the data channel between the second macro base station 10a2 and the wireless terminal 20) between the wireless station and the third base station 10, without handing over the second data communication to the first communication channel.

Figure 6A:
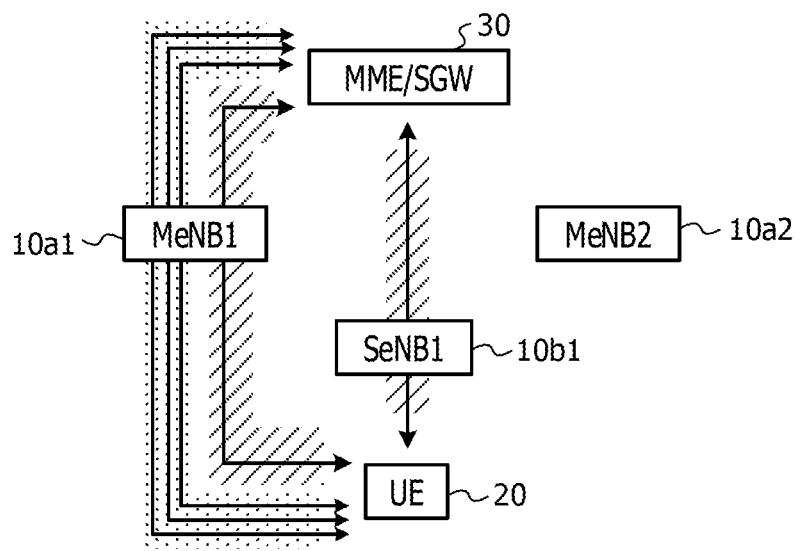
FIGS. 6A & 6B are diagrams for describing a first embodiment.
Figure 6B:
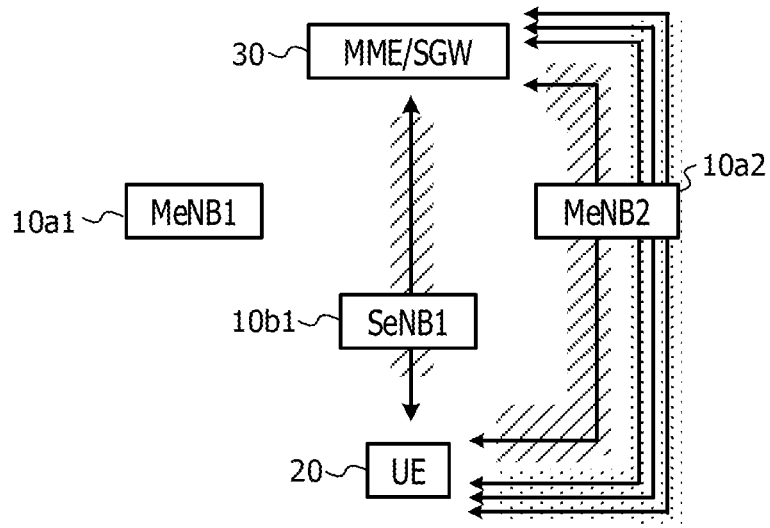

The first embodiment is described referring to FIGS. 6A to 6B. Moreover, unless otherwise specified, for a premise, a term or the like according to the first embodiment, follows the "Problem Identification" described above. For this reason, at this point, description of these are omitted.

In FIG. 6A, the wireless terminal 20 has the dual connectivity to the first macro base station 10a1 and the first small base station 10b1. Because FIG. 6A illustrates the same state as FIG. 5A, at this point, at this point, a brief description is provided. Each of the control plane and the user plane is connected through the data channel (the PUSCH in the case of the uplink or the PDSCH in the case of the downlink) between the wireless terminal 20 and the first macro base station 10a1. As one example, it is assumed that SRB 0, SRB 1, and SRB 2 that are three control bearers are configured for the control plane and that DRB 0 that is one data bearer is configured for the user plane. On the other hand, the user plane is connected through the data channel (the PUSCH in the case of the uplink or the PDSCH in the case of the downlink) between the wireless terminal 20 and the first small base station 10b1. As one example, it is assumed that DRB 1 that is one data bearer is configured for the user plane.

At this point, it is assumed that the first macro base station 10a1 causes the wireless terminal 20, which has the dual connectivity, to perform handover to the second macro base station 10a2. The first macro base station 10a1, for example, can make the decision of the handover based on the measurement report or the like that is received periodically from the wireless terminal 20.

Based on the decision of the handover, as described in FIG. 6B, the wireless terminal 20 performs the handover from the first macro base station 10a1 to the second macro base station 10a2. At this time, without handing over the data bearer that is configured between the wireless terminal 20 and the first small base station 10b1, the first macro base station 10a1 hands over the data bearer that is configured between the wireless terminal 20 and the first macro base station 10a1 to the second macro base station 10a2. That is, in FIG. 6B, while continuing (maintaining) the data bearer in an as-is state that is configured between the wireless terminal 20 and the first small base station 10b1, the first macro base station 10a1 hands over the data bearer that is configured between the wireless terminal 20 and the first macro base station 10a1, to the second macro base station 10a2.

Processing operations are described in more detail referring to FIGS. 6A and 6B. First, with the handover, the wireless terminal 20 is in the RRC_CONNECTED state between the wireless terminal 20 itself and the second macro base station 10a2, and the control plane and the user plane are connected on the data channel (the PUSCH in the case of the uplink or the PDSCH in the case of the downlink) between the wireless terminal 20 and the second macro base station 10a2.

At this time, the first macro base station 10a1 notifies the second macro base station 10a2 of the information indicating various attributes (parameters, such as the ID of the data bearer and the service level in the data bearer) relating to all the data bears (specifically, DRB 0) that are configured on the data channel between the wireless terminal 20 and the first macro base station 10a1. Accordingly, the second macro base station 10a2 hands over DRB 0. Furthermore, the control bearers (specifically, SRB 0, SRB 1, and SRB 2) are newly configured on the data channel between the second macro base station 10a2 and the wireless terminal 20. Accordingly, SRB 0, SRB 1, and SRB 2 that are three control bearers are configured for the control plane on the data channel between the wireless terminal 20 and the second macro base station 10a2, and DRB 0 that are one data bearers are in the state of being configured for the user plane between the wireless terminal 20 and the second macro base station 10a2.

At this point, the data bearer (DRB 0) are described as being handed over from the first macro base station 10a1 to the second macro base station 10a2, but it is noted that the handing over means handing over various attributes (parameters such as the ID of the data bearer and the service level in the data bearer) that are configured, with a comparatively higher layer, for the data bearer. In contrast, according to the specifications of the LTE system in the related art, the re-establishment is performed on each bearer (specifically, the data bearer DRB 0 and the control bearers DRB 0 to DRB 2) that is handed over, in a comparatively lower layer (specifically, the PDPC layer or the RLC layer that is equivalent to L2) for the wireless connection.

On the other hand, DRB 1, which is the data bearer that is configured on the data channel (the PUSCH in the case of the uplink or the PDSCH in the case of the downlink) between the wireless terminal 20 and the first small base station 10b1 before the handover, is maintained (continued) without any change even if the handover is ended. For this reason, the first macro base station 10a1 in FIG. 6 does not hand over the data bearer (DRB 1) that is configured between the wireless terminal 20 and the first small base station 10b1, which is different from the case in FIG. 5.

At this point, care has to be exercised to assume that the re-establishment in a comparatively lower layer (specifically, the PDPC layer or the RLC layer) for the wireless connection is not performed on the data bearer (DRB 1) that is maintained between the wireless terminal 20 and the first small base station 10b1. As described above, according to the specifications of the LTE system in the related art, the re-establishment is performed on each bearer (the data bearer and the control bearer) at the time of the handover in a comparatively lower layer (specifically, the PDPC layer or the RLC layer) for the wireless connection. According to the present embodiment, because the data bearer (DRB 1) that is maintained between the wireless terminal 20 and the first small base station 10b1 is handled as an exception to the conventional specifications, it is indispensable to exercise care.

According to the first embodiment described above, as illustrated in FIGS. 6A and 6B, when the wireless terminal 20 that has the dual connectivity performs the handover, the first macro base station ends up even without temporarily handing over the data bearer that is configured for the first small base station 10b1. For this reason, according to the first embodiment, it is possible that the handover is performed with the small number of procedures when compared with the reference technology that is described referring to FIGS. 5A to 5D. Accordingly, according to the first embodiment, the handover by the terminal 20 that has the dual connectivity can be shortened, and the concern, such as the instantaneous disconnection, which results when the handover takes the time, can be reduced. Therefore, according to the first embodiment, an effect in which the mobile control that is desirable in a case where the dual connectivity is realized is performed, which is not available in the related art, is accomplished.

Second Embodiment

A second embodiment is an embodiment on the assumption of the installation of the base station 10 in FIG. 3, which is described above, and is one example of an embodiment that results from specifically applying the first embodiment to the LTE system. Moreover, unless otherwise specified, with the exception of this, a premise, a term or the like according to the second embodiment follows the "Problem Identification" described above or the first embodiment. For this reason, at this point, description of these are omitted.

Figure 7:
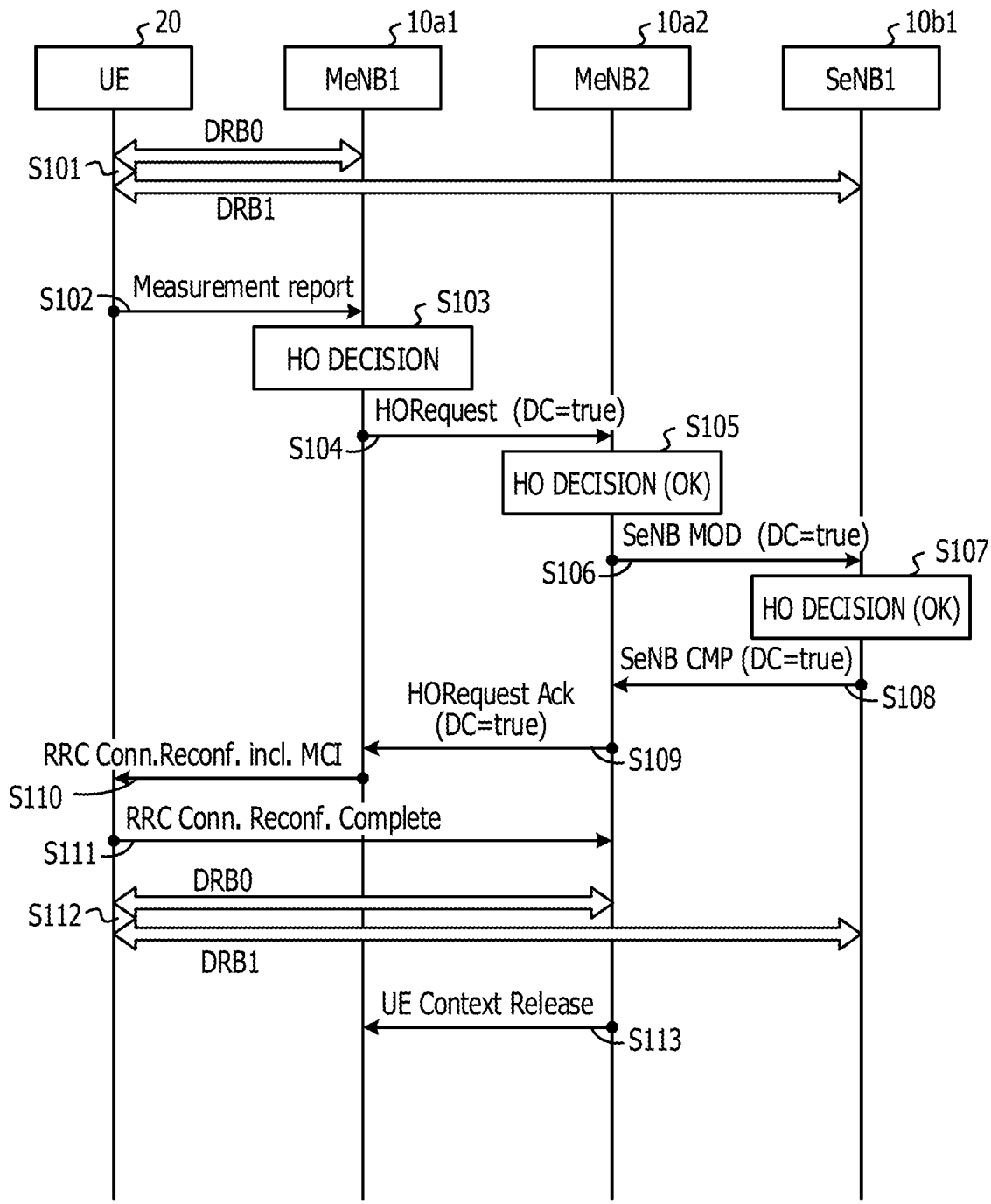
FIG. 7 is a diagram illustrating one example of a first processing sequence according to a second embodiment.

FIG. 7 illustrates one example of a processing sequence according to the second embodiment. FIG. 7 can be interpreted as the processing sequence in a normal system according to the second embodiment. Moreover, it is noted that in FIG. 7 and in subsequent similar sequence diagrams, illustrations of the MME and the SGW 30 that is the higher devices are omitted. Furthermore, it is noted that in FIG. 7 and in the subsequent similar sequence diagrams, the data bearer is suitably illustrated, but an illustration of the control bearer is also omitted.

In S101 in FIG. 7, the wireless terminal 20 makes the dual connectivity to the first macro base station 10a1 and the first small base station 10b1. At this point, as one example, it is assumed that the wireless terminal 20 configures the data bearer DRB 0 on the data channel (the PUSCH in the case of the uplink or the PDSCH in the case of the downlink) between the wireless terminal itself and the first macro base station 10a1. Furthermore, it is assumed that the wireless terminal 20 configures the data bearer DRB 1 on the data channel between the wireless terminal 20 itself and the first small base station 10b1. It is noted that the dual connectivity that is illustrated in S101 is maintained until a prescribed timing (specifically, S110 that will be described below).

Next, in S102, the wireless terminal 20 transmits the measurement report to the first macro base station 10a1. The measurement report includes a result of measurement of each base station 10, which is based on a reference signal that is transmitted from each base station 10. For example, a result of measurement of each of the first macro base station 10a1, the second macro base station 10a2, and the first small base station 10b1 is included in the measurement report in S102.

Next, in S103, as one example, the first macro base station 10a1 makes the decision of the handover of the determines that the wireless terminal 20 is caused to perform the handover (HO), based on the measurement report in S102. At this point, as one example, it is assumed that the first macro base station 10a1 determines that the wireless terminal 20 is caused to perform the handover to the second macro base station 10a2.

At this time, in S104, the first macro base station 10a1 transmits HO Request that is an X2 message for requesting the handover, to the second macro base station 10a2. At this point, HO Request is the X2 message that is stipulated in the LTE system, but according to the present embodiment, HO Request of which one portion is amended is used.

FIG. 8 illustrates one example of an information element that is included in HO Request that is used according to the present embodiment. In FIG. 8, a name (IE/GroupName) and Presence of each information element are described together. Moreover, the number of marks ">" that are attached to each name indicates the hierarchical depth of the information element. Furthermore, Presence indicates each information element is mandatory (M) or is an option (O).

In FIG. 8, an underlined portion is equivalent to a portion that is attached to HO Request in the related art. Big differences from HO Request in the related art are broadly categorized into two differences. Moreover, generally, because the base station 10 that is a handover one is referred to as the serving base station 10 (or, simply, serving) and the base station 10 that is a handover destination is referred to as the target base station 10 (or, simply, a target), these names also will be used below.

A first difference from HO Request in the related art in FIG. 8 is that HO Request in the related art includes an identifier of the target macro base station 10*a*, but in addition to this, HO Request according to the present embodiment includes an identifier of the small base station 10*b* to which the wireless terminal 20 performs the dual connectivity. Specifically, the identifier of the small base station 10*b* to which the wireless terminal 20 performs the dual connectivity at the time of the handover is stored in Target Secondary Cell ID in FIG. 8. Incidentally, the identifier of the macro base station 10*a* is stored in Target Master Cell ID.

Accordingly, when the target macro base station 10*a* (the second macro base station 10*a*2 according to the present embodiment) receives HO Request, the target macro base station 10*a* can recognize the small base station 10*b* (the first small base station 10*b*1 according to the present embodiment) to which the wireless terminal 20 performs the dual connectivity at the time of the handover.

Moreover, the identifier of the small base station 10*b* is included in Old Target Secondary Cell ID as well as in Target Secondary Cell ID in FIG. 8. According to the present embodiment, the identifier of the small base station 10*b* to which the wireless terminal 20 makes the dual connectivity at the time of the handover is also stored in any one of Target Secondary Cell ID and Old Target Secondary Cell ID. That is, the same value is stored in Target Secondary Cell ID and Old Target Secondary Cell ID. The significance in which two information element for storing the identifier of the small base station 10*b* are present is described according to a fourth embodiment that will be described below.

Furthermore, Target Secondary Cell ID or Old Target Secondary Cell ID in FIG. 8 is an information element of an option. This means that these pieces of information elements are not notified (are removed from) with HO Request in a case where the wireless terminal 20 has not the dual connectivity (in a normal case).

A second difference from HO Request in the related art in FIG. 8 is that HO Request in the related art includes attribute information of each bearer that is handed over from the serving macro base station 10*a* to the target macro base station 10*a*, but in addition to this, HO Request according to the present embodiment includes the attribute information of each bearer in the small base station 10*b* to which the wireless terminal 20 has the dual connectivity. Specifically, the attribute information of each bearer in the small base station 10*b* to which the wireless terminal 20 has the dual connectivity is stored in Secondary E-RABs To Be Setup Item in FIG. 8. Incidentally, the attribute information of each bearer that is handed over from the serving macro base station 10*a* to the target macro base station 10*a* is stored in Master E-RABs To Be Setup Item.

Secondary E-RABs To Be Setup Item is configured for every bearer, and Secondary E-RABs To Be Setup Item of each bearer includes information elements, E-RAB ID, E-RAB Level QoS Parameter, DL Forwarding, and UL GTP Tunnel Endpoint. E-RAB ID is an ID of a bearer, and E-RAB Level QoS Parameter is an information element indicating a service level of the bearer. Furthermore, DL Forwarding is an information element indicating whether or not downlink communication of a bearer is transferred from the serving base station 10 to the target base station 10 during the handover, and UL GTP Tunnel Endpoint is an information element indicating a termination point of uplink communication of the bearer.

At this point, according to the present embodiment, it is assumed that all the bearers are allowed not to be continued (maintained) without any change in the small base station 10*b* to which the wireless terminal 20 has the dual connectivity. To put it another way, it is assumed that the target base station 10 according to the present embodiment can cause the serving base station 10 to selectively hand over each bearer in the small base station 10*b* to which the wireless terminal 20 has the dual connectivity.

According to the present embodiment, using the information element, DL Forwarding, which is described above, it is indicated whether or not continuance takes place without any change between each bearer in the small base station 10*b* to which the wireless terminal 20 has the dual connectivity. More details are as follows. As described above, according to the present embodiment, the same value is stored in Target Secondary Cell ID and Old Target Secondary Cell ID. In this case, the DL Forwarding information element is not configured (that is, is not notified) for the continuance without any change in the small base station 10*b* between each bearer. The reason for this is that the transfer of the downlink communication to the target base station 10 is unnecessary for the bearer that is continued in the small base station 10*b*. In contrast, the DL Forwarding information element is configured for handing over to the target base station 10 without the continuance taking placing in the small base station 10*b* between each bearer. The reason for this is that the transfer of the downlink communication to the target base station 10 is indispensable for the bearer that is not continued in the small base station 10*b*.

Accordingly, when the target macro base station 10*a* (the second macro base station 10*a*2 according to the present embodiment) receives HO Request, the target macro base station 10*a* can recognize that the continuance takes place without any change between each bearer in the small base station 10*b* (the first small base station 10*b*1 according to the present embodiment) to which the wireless terminal 20 makes the dual connectivity at the time of the handover and that the target is handed over.

In a sequence that is illustrated in FIG. 7, it is assumed that the bearer DRB 1 in the small base station 10*b* is designated as being continued (maintained) without any change, in HO Request that is transmitted by the first macro base station 10*a*1 to the second macro base station 10*a*2 in S104. Specifically, it is assumed that the information element, DL Forwarding, which is included in Secondary E-RABs To Be Setup Item that corresponds to the bearer DRB 1, is not configured. Moreover, in FIG. 7 and in the subsequent similar sequence diagrams, the continuance (maintenance) of the bearer without any change in the small base station 10*b* is expressed as DC=true in the sense that the dual connectivity is continued. In contrast, the handing over the bearer to the target base station 10 without continuing (maintaining) the bearer without any change in the small base station 10*b* is expressed as DC=false in the sense that the dual connectivity is released.

Next, in S105, based on HO Request in S104, the second macro base station 10*a*2 makes a decision of (determines) whether or not to continue the dual connectivity (DC). The second macro base station 10*a*2 can not only perform this determination using designation of HO Request without any change, but may also perform this determination considering other elements. As other elements, wireless quality, a congestion situation, or the like in each base station 10 is considered.

In the sequence that is illustrated in FIG. 7, it is assumed that the second macro base station 10*a*2 in S105 makes the decision of continuing (maintaining) the bearer DRB 1 without any change in the small base station 10*b* (DC is determined as OK).

At this time, the second macro base station 10*a*2 in S106 transmits SeNBMOD that is the X2 message for making a change, such as performing configuration for the small base station 10*b*, to the first small base station 10*b*1. Because SeNBMOD can be configured in such a manner as to include the same information element as HO Request described above, at this point, a description thereof is omitted.

In the sequence that is illustrated in FIG. 7, it is assumed that the bearer DRB 1 in the small base station 10*b* is designated as being continued (maintained) without any change, in SeNBMOD that is transmitted by the second macro base station 10*a*2 to the first small base station 10*b*1 in S106 (DC=true).

Next, based on SeNBMOD in S106, the first small base station 10*b*1 in S107 makes the decision of (determines) whether or not to continue the dual connectivity (DC). It is difficult for the first small base station 10*b*1 to not only perform this determination using designation of SeNBMOD without any change, but may also perform this determination considering other elements. As other elements, wireless quality, a congestion situation, or the like in each base station 10 is considered.

In the sequence that is illustrated in FIG. 7, it is assumed that the first small base station 10*b*1 in S107 makes the decision of continuing (maintaining) the bearer DRB 1 without any change in the first small base station 10*b*1 (DC is determined as OK).

At this time, the first small base station 10*b*1 in S108 transmits SeNBCMP that is the X2 message for notifying completion of the configuration and the like for the small base station 10*b*, to the second macro base station 10*a*2. Because SeNBCMP can be configured in such a manner as to include the same information element as HO Request ACK that will be described below, at this point, a description thereof is omitted.

In the sequence that is illustrated in FIG. 7, it is assumed that the bearer DRB 1 in the small base station 10*b* is designated as being continued (maintained) without any change, in SeNBCMP that is transmitted by the first small base station 10*b*1 to the second macro base station 10*a*2 in S108 (DC=true).

At this time, the second macro base station 10*a*2 in S109 transmits HO Request ACK that is a response message to HO Request in S104, to the first macro base station 10*a*1. At this point, HO Request ACK is the X2 message that is stipulated in the LTE system, but according to the present embodiment, HO Request ACK of which one portion is amended is used.

FIG. 9 illustrates one example of an information element that is included in HO Request ACK that is used according to the present embodiment. Because a point of view of FIG. 9 is the same as that of FIG. 8, a description thereof is omitted.

A difference from HO Request ACK in the related art in FIG. 9 is that HO Request ACK in the related art includes the attribute information of each bearer that is handed over from the serving macro base station 10*a* to the target macro base station 10*a*, but in addition to this, HO Request ACK according to the present embodiment includes the attribute information of each bearer in the small base station 10*b* to which the wireless terminal 20 has the dual connectivity. Specifically, the attribute information of each bearer in the small base station 10*b* to which the wireless terminal 20 has the dual connectivity is stored in Secondary E-RABs Admit-ted Item in FIG. 9. Incidentally, the attribute information of each bearer that is handed over from the serving macro base station 10*a* to the target macro base station 10*a* is stored in Master E-RABs Admitted Item.

Secondary E-RABs Admitted Item is configured for every bearer, and Secondary E-RABs Admitted Item of each bearer includes information elements, E-RABID, DL GTP Tunnel Endpoint, and UL GTP Tunnel Endpoint. E-RABID is an ID of a bearer. Furthermore, DL GTP Tunnel Endpoint is an information element indicating a termination point of the downlink communication of the bearer, and UL GTP Tunnel Endpoint is an information element indicating the termination point of the uplink communication of the bearer.

At this point, as described above, according to the present embodiment, all the bearers are allowed not to be continued (maintained) without any change in the small base station 10*b* to which the wireless terminal 20 has the dual connectivity. To put it another way, the target base station 10 according to the present embodiment can cause the serving base station 10 to selectively hand over each bearer in the small base station 10*b* to which the wireless terminal 20 has the dual connectivity.

According to the present embodiment, using the DL GTP Tunnel Endpoint information element and the UL GTP Tunnel Endpoint information element, which are described above, it is indicated whether or not the continuance takes place without any change between each bearer in the small base station 10*b* to which the wireless terminal 20 has the dual connectivity. More details are as follows. As described above, according to the present embodiment, the same value is stored in Target Secondary Cell ID and Old Target Secondary Cell ID. In this case, the DL GTP Tunnel Endpoint information element and the UL GTP Tunnel Endpoint information element are not configured (that is not notified) for the continuance without any change in the small base station 10*b* between each bearer. The reason for this is that notification of an uplink or downlink endpoint is unnecessary for the bearer that is continued in the small base station 10*b*. In contrast, the DL GTP Tunnel Endpoint information element and the UL GTP Tunnel Endpoint information element are configured for handing over to the target base station 10 without the continuance taking placing in the small base station 10*b* between each bearer. The reason for this is that the notification of the uplink or downlink endpoint is indispensable for the bearer that is not continued in the small base station 10*b*.

Accordingly, when the serving macro base station 10*a* (the first macro base station 10*a*1 according to the present embodiment) receives HO Request ACK, the serving macro base station 10*a* can recognize that the continuance takes place without any change between each bearer in the small base station 10*b* (the first small base station 10*b*1 according to the present embodiment) to which the wireless terminal 20 makes the dual connectivity at the time of the handover and that the target is handed over.

In a sequence that is illustrated in FIG. 7, it is assumed that the bearer DRB 1 in the small base station 10*b* is designated as being continued (maintained) without any change, in HO Request that is transmitted by the first macro base station 10*a*1 to the second macro base station 10*a*2 in S109. Specifically, it is assumed that the DL GTP Tunnel Endpoint information element and the UL GTP Tunnel Endpoint information element, which are included in Secondary E-RABs Admitted Item that corresponds to the bearer DRB 1, are not configured.

Next, in S110 in FIG. 7, the first macro base station 10*a*1 transmits an RRC Connection Reconfiguration message to the wireless terminal 20. At this time, an information element, Mobility Control Info (MCI), which is equivalent to information for notifying the handover to the wireless terminal 20, is included in the RRC Connection Reconfiguration message. Because, for the RRC Connection Reconfiguration message or the Mobility Control Info information element, the existing message or information element, respectively, in the LTE system in the related art, may be used, descriptions thereof are omitted.

When the wireless terminal 20 receives the RRC Connection Reconfiguration message that includes the Mobility Control Info information element, the wireless terminal 20 releases the connection to the first macro base station 10*a*1 that is the serving (Detach). Then, subsequently, the wireless terminal 20 performs synchronization processing on the second macro base station 10*a*2 that is the target. Accordingly, the wireless terminal 20 is in the RRC_CONNECTED state between the wireless terminal 20 itself and the second macro base station 10*a*2, and the control plane and the user plane are connected on the data channel (the PUSCH in the case of the uplink or the PDSCH in the case of the downlink) between the wireless terminal 20 and the second macro base station 10*a*2.

At this time, the second macro base station 10*a*2 hands over all the data bearers (specifically, DRB 0) that are configured on the data channel between the wireless terminal 20 and the first macro base station 10*a*1. The handing over can be performed based on Secondary E-RABs To Be setup item that is the attribute information of the bearer which is included in the SeNBMOD message that is received in S106. Accordingly, a state where DRB 0 that is one data bearer is configured for the user plane on the data channel between the wireless terminal 20 and the second macro base station 10*a*2 is obtained.

Next, the wireless terminal 20 in S111 in FIG. 7 transmits an RRC Connection Reconfiguration Complete message that is a response message to the RRC Connection Reconfiguration message in S110, to the first macro base station 10*a*1. Because, for the RRC Connection Reconfiguration Complete message, the existing message in the LTE system in the related art, may be used, descriptions thereof are omitted.

As described above referring to S112 in FIG. 7, the wireless terminal 20 is in a state of performing the dual connectivity to the second macro base station 10*a*2 and the first small base station 10*b*1. At this time, a state where the data bearer DRB 0 is configured on the data channel (the PUSCH in the case of the uplink or the PDSCH in the case of the downlink) between the wireless terminal 20 and the second macro base station 10*a*2 is obtained. Furthermore, a state where the data bearer DRB 1 is configured for the data channel between the wireless terminal 20 and the first small base station 10*b*1 is obtained.

Last, in S113 in FIG. 7, the second macro base station 10*a*2 transmits a UE Context Release message to the first macro base station 10*a*1. Accordingly, the first macro base station 10*a*1 releases UE Context (a radio resource) that is retained for the wireless terminal 20. Accordingly, the handover processing is completed.

Next, FIG. 10 illustrates one example of a processing sequence according to the second embodiment. FIG. 10 can be interpreted as one example of the processing sequence in a semi-normal system according to the second embodiment. Because many portions of the processing in FIG. 10 overlap with those in FIG. 7, at this point, a flow of processing is briefly described.

In FIG. 7, according to the HO Request request in S104, the second macro base station 10*a*2 in S105 makes the decision of continuing (maintaining) without any change the bearer DRB 1 in the first small base station 10*b*1 (DC is determined as OK). In contrast, regardless of the HO Request request in S204, the second macro base station 10*a*2 in S205 in FIG. 10 makes the decision of not continuing (maintaining) without any change the bearer DRB 1 in the first small base station 10*b*1 (DC is determined as NG). The meaning of this difference is that while the second macro base station 10*a*2 receives a request (DC=true) by the first macro base station 10*a*1 in FIG. 7, the second macro base station 10*a*2 does not receive the request (DC=true) by the first macro base station 10*a*1 in FIG. 10.

As illustrated in FIG. 10, in a case where the bearer DRB 1 is not continued (maintained) without any change, in the first small base station 10*b*1, the second macro base station 10*a*2 that is the target hands over DRB 1. Therefore, the dual connectivity by the wireless terminal 20, which accompanies the handover, is released, and the post-handover wireless terminal 20 is in a state of connecting to only the target macro base station 10*a*.

In S206 to S211 in FIG. 10, processing operations sequentially proceeds according to the decision in S205. As a result, as is illustrated in S212 in FIG. 10, the wireless terminal 20 is in a state of connecting to only the second macro base station 10*a*2 (that is, the dual connectivity is released). At this time, a state where the data bearers DRB 0 and DRB 1 are configured on the data channel (the PUSCH in the case of the uplink or the PDSCH in the case of the downlink) between the wireless terminal 20 and the second macro base station 10*a*2 is obtained.

Figure 11:
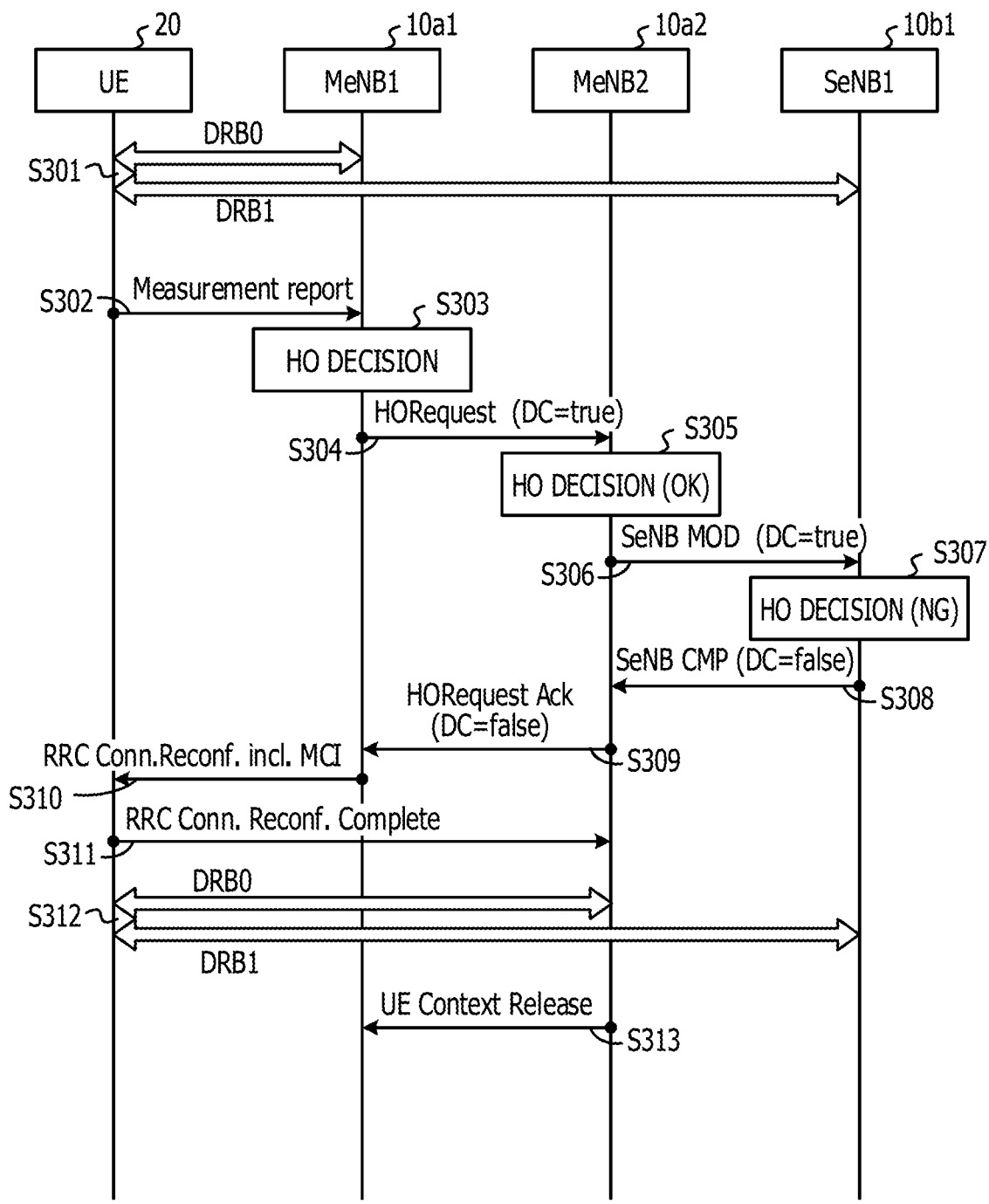
FIG. 11 is a diagram illustrating one example of a third processing sequence according to the second embodiment.

Additionally, FIG. 11 illustrates one example of the processing sequence according to the second embodiment. FIG. 11 can be interpreted as another example of the processing sequence in the semi-normal system according to the second embodiment. Because many portions of the processing in FIG. 11 overlap with those in FIG. 7 or 10, at this point, a flow of processing is briefly described.

In FIG. 7, according to the SeNBMOD request in S106, the first small base station 10*b*1 in S107 makes the decision of continuing (maintaining) without any change the bearer DRB 1 in the first small base station 10*b*1 (DC is determined as OK). In contrast, regardless of the SeNBMOD request in S306, the first small base station 10*b*1 in S307 in FIG. 11 makes the decision of not continuing (maintaining) without any change the bearer DRB 1 in the first small base station 10*b*1 (DC is determined as NG). The meaning of this difference is that while the first small base station 10*b*1 receives the request (DC=true) by the first macro base station 10*a*1 and the second macro base station 10*a*2 in FIG. 7, the first small base station 10*b*1 does not receive the request (DC=true) by the first macro base station 10*a*1 and the second macro base station 10*a*2 in FIG. 11.

As illustrated in FIG. 11, in the case where the bearer DRB 1 is not continued (maintained) without any change, in the first small base station 10*b*1, the second macro base station 10*a*2 that is the target hands over DRB 1 as is the case in FIG. 10. Therefore, the dual connectivity by the wireless terminal 20, which accompanies the handover, is released, and the post-handover wireless terminal 20 is in a state of connecting to only the target macro base station 10*a*.

In S308 to S311 in FIG. 11, processing operations sequentially proceed according to the decision in S307. As a result, as is illustrated in S312 in FIG. 11, the wireless terminal 20 is in the state of connecting to only the second macro base station 10*a*2 (that is, the dual connectivity is released). At this time, the state where the data bearers DRB 0 and DRB 1 are configured on the data channel (the PUSCH in the case of the uplink or the PDSCH in the case of the downlink) between the wireless terminal 20 and the second macro base station 10a2 is obtained.

The processing sequence according to the second embodiment described above, which are illustrated in FIGS. 7, 10, and 11, when the wireless terminal 20 that has the dual connectivity performs the handover, the first macro base station 10a1 that is the serving ends up even without temporarily handing over each data bearer that is configured for the first small base station 10b1. Accordingly, the problem with the reference technology described above is solved. That is, according to the second embodiment, it is possible that the handover is performed with the small number of procedures when compared with the reference technology described above, and the concern, such as the instantaneous disconnection, can be reduced.

Additionally, according to the second embodiment, a selective determination of whether each data bearer that is configured between the wireless terminal 20 and the first small base station 10b1 is continued without any change in the first small base station 10b1, or is handed over from the first small base station 10b1 to the second macro base station 10a2 can be made. Furthermore, as illustrated in each figure, it is possible that this selective determination is made in each of the first macro base station 10a1, the second macro base station 10a2, and the first small base station 10b1. Accordingly, according to the second embodiment, it is possible that bearer management is flexibly performed in the wireless terminal 20 that has the dual connectivity.

In summary, according to the second embodiment, in the same manner as in the first embodiment, when the wireless terminal 20 that has the dual connectivity performs the handover, the first macro base station 10a1 ends up even without temporarily handing over the data bearer that is configured for the first small base station 10b1. For this reason, according to the second embodiment, it is possible that the handover is performed with the small number of procedures when compared with the reference technology described above. Accordingly, according to the second embodiment, the handover by the terminal 20 that has the dual connectivity can be shortened, and the concern, such as the instantaneous disconnection, which results when the handover takes the time, can be reduced. Therefore, according to the second embodiment, the effect in which the mobile control that is desirable in the case where the dual connectivity is realized is performed, which is not available in the related art, is accomplished.

Third Embodiment

A third embodiment is an embodiment on the assumption of the installation of the base station 10 in FIG. 2, which is described above, and is an embodiment that basically corresponds to the first embodiment. Moreover, unless otherwise specified, with the exception of this, a premise, a term or the like according to the third embodiment follows the "Problem Identification" described above or the embodiments described above. For this reason, at this point, description of these are omitted.

Figure 12A:
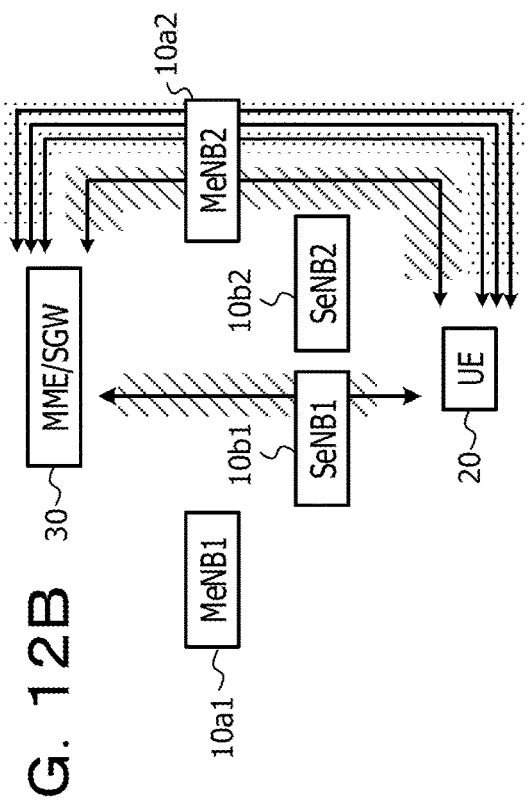
FIGS. 12A, 12B & 12C are diagrams for describing a third embodiment.
Figure 12B:
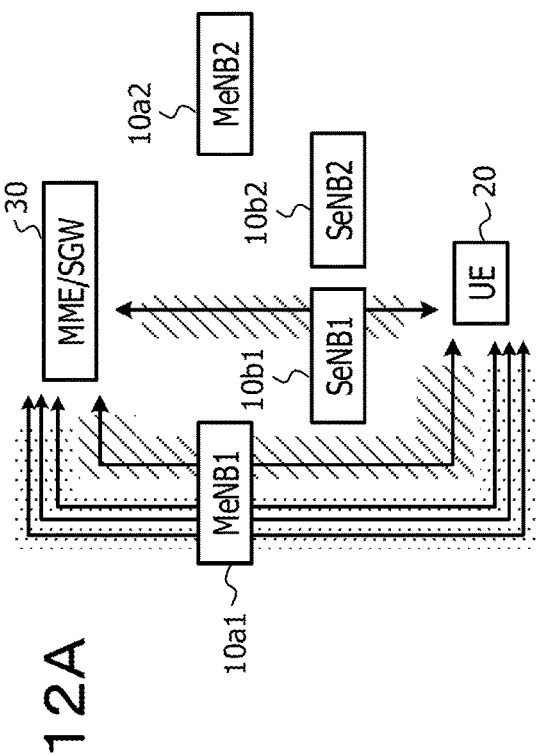
Figure 12C:
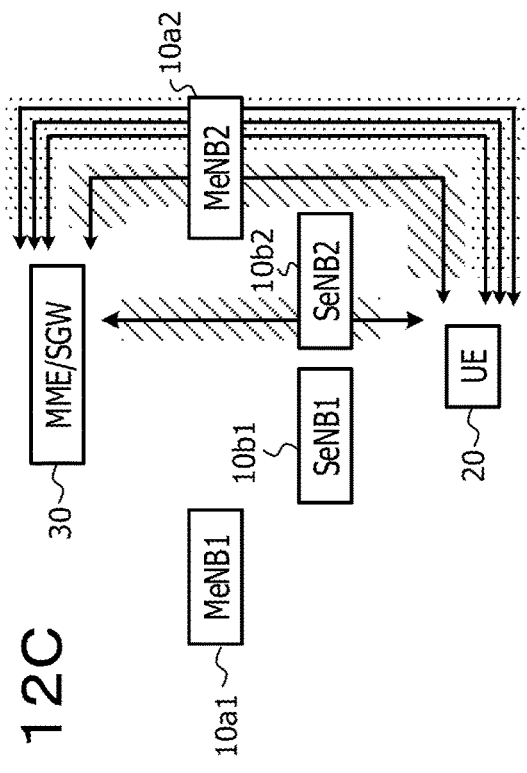

The third embodiment is described referring to FIGS. 12A to 12C. In FIG. 12A, the wireless terminal 20 has the dual connectivity to the first macro base station 10a1 and the first small base station 10b1. At this point, each of the control plane and the user plane is connected through the data channel (the PUSCH in the case of the uplink or the PDSCH in the case of the downlink) between the wireless terminal 20 and the first macro base station 10a1. As one example, it is assumed that SRB 0, SRB 1, and SRB 2 that are three control bearers are configured for the control plane and that DRB 0 that is one data bearer is configured for the user plane. On the other hand, the user plane is connected through the data channel (the PUSCH in the case of the uplink or the PDSCH in the case of the downlink) between the wireless terminal 20 and the first small base station 10b1. As one example, it is assumed that DRB 1 that is one data bearer is configured for the user plane.

At this point, it is assumed that the first macro base station 10a1 causes the wireless terminal 20, which has the dual connectivity, to perform handover to the second macro base station 10a2. The first macro base station 10a1, for example, can make the decision of the handover based on the measurement report or the like that is received periodically from the wireless terminal 20.

Based on the decision of the handover, as described in FIG. 12B, the wireless terminal 20 performs the handover from the first macro base station 10a1 to the second macro base station 10a2. At this time, without handing over the data bearer that is configured between the wireless terminal 20 and the first small base station 10b1, the first macro base station 10a1 hands over the data bearer that is configured between the wireless terminal 20 and the first macro base station 10a1 to the second macro base station 10a2. That is, in FIG. 12B, while continuing (maintaining) the data bearer in an as-is state that is configured between the wireless terminal 20 and the first small base station 10b1, the first macro base station 10a1 hands over the data bearer DRB 0 that is configured between the wireless terminal 20 and the first macro base station 10a1, to the second macro base station 10a2.

Additionally, with the handover, as illustrated in FIG. 12C, the second small base station 10b2 hands over the data bear DRB 1 that is configured between the wireless terminal 20 and the first small base station 10b1. The reason for this is that because the first small base station 10b1 is not under the control of the second macro base station 10a2, as long as the wireless terminal 20 performs the handover to the second macro base station 10a2, there is no reason to continue (maintain) without any change the data bearer DRB 1 that is configured between the wireless terminal 20 and the first small base station 10b1.

As a result, as illustrated in FIG. 12C, the wireless terminal 20 is in a state of having the dual connectivity to the second macro base station 10a2 and the second small base station 10b2. At this point, each of the control plane and the user plane is connected through the data channel (the PUSCH in the case of the uplink or the PDSCH in the case of the downlink) between the wireless terminal 20 and the second macro base station 10a2. SRB 0, SRB 1, and SRB 2 that are three control bearers are configured for the control plane and that DRB 0 that is one data bearer is configured for the user plane. On the other hand, the user plane is connected through the data channel (the PUSCH in the case of the uplink or the PDSCH in the case of the downlink) between the wireless terminal 20 and the second small base station 10b2. DRB 1 that is one data bearer is configured for the user plane.

According to the third embodiment described above, as described in FIGS. 12A to 12C, when the wireless terminal 20 that has the dual connectivity performs the handover, the first macro base station 10a1 ends up even without temporarily handing over the data bearer that is configured for the first small base station 10b1. For this reason, according to the third embodiment, it is possible that the handover is performed with the small number of procedures when compared with the reference technology that is described referring to FIGS. 4A to 4D. Accordingly, according to the third embodiment, the handover by the wireless terminal 20 that has the dual connectivity can be shortened, and the concern, such as the instantaneous disconnection, which results when the handover takes the time, can be reduced. Therefore, according to the third embodiment, the effect in which the mobile control that is desirable in the case where the dual connectivity is realized is performed, which is not available in the related art, is accomplished.

Fourth Embodiment

A fourth embodiment is an embodiment on the assumption of the installation of the base station 10 in FIG. 2, which is described above, and is one example of an embodiment that results from specifically applying the third embodiment to the LTE system. Moreover, unless otherwise specified, with the exception of this, a premise, a term or the like according to the fourth embodiment follows the "Problem Identification" described above or the embodiments described above. For this reason, at this point, description of these are omitted.

Figure 13:
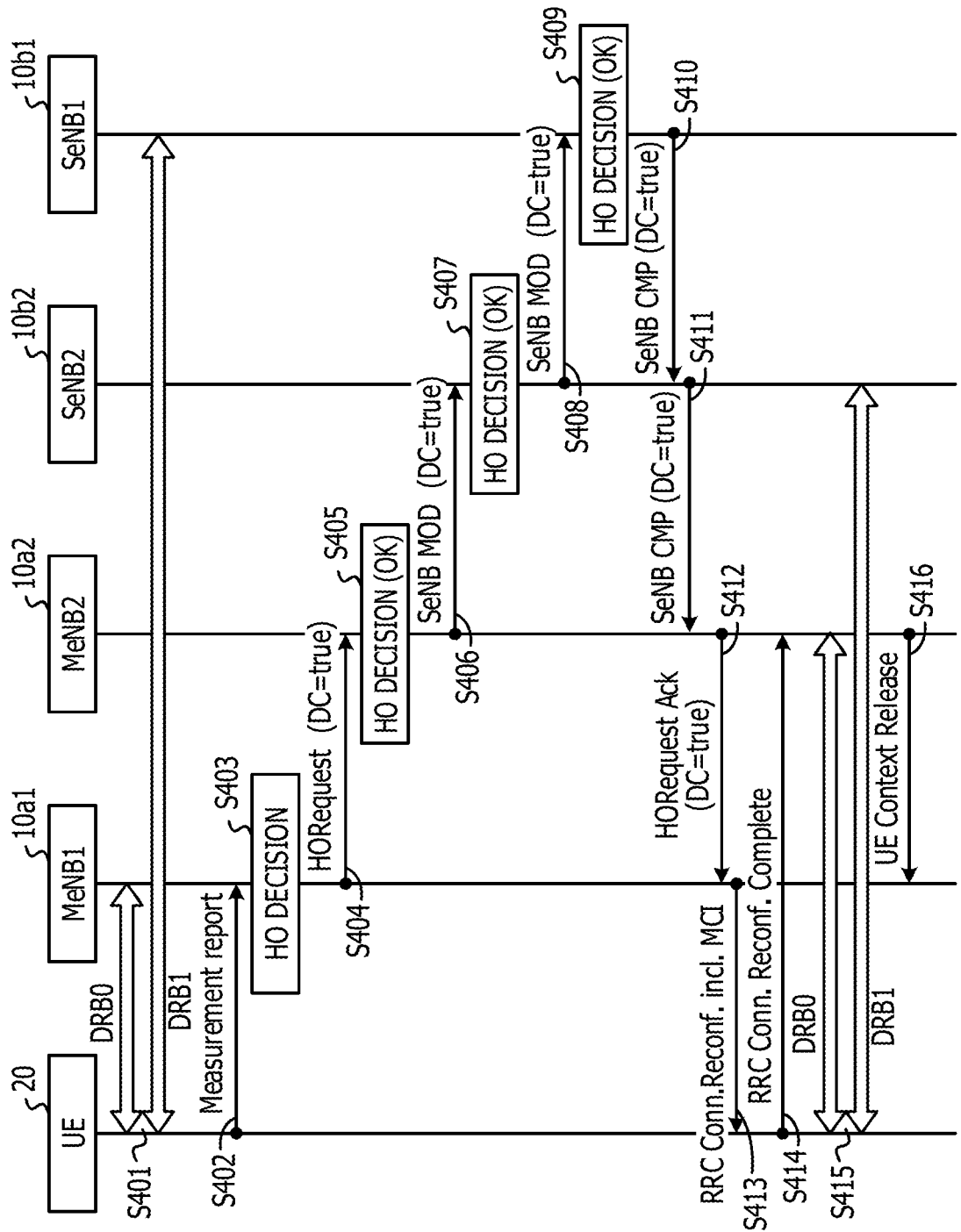
FIG. 13 is a diagram illustrating one example of a first processing sequence according to the third embodiment.
Figure 14:
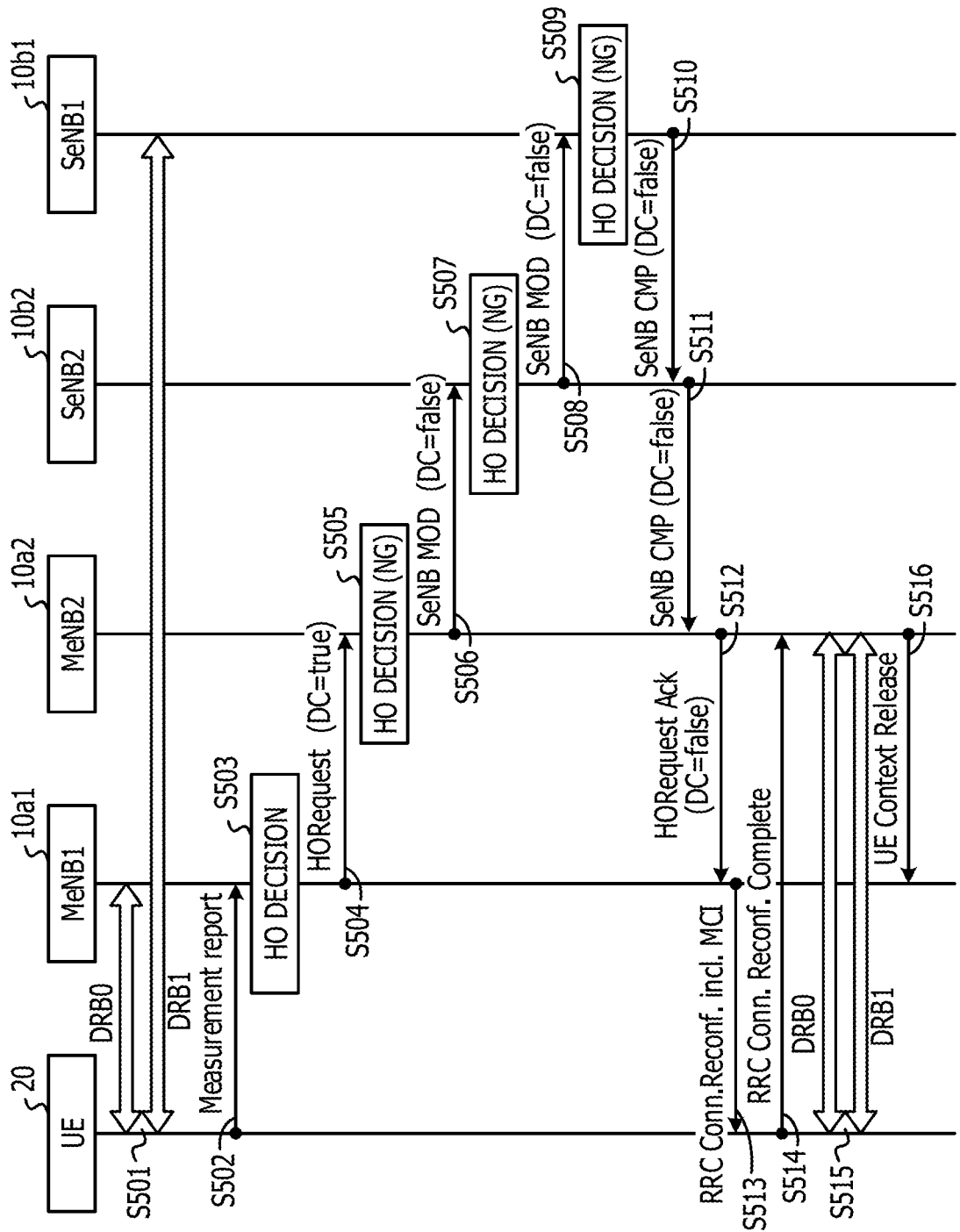
FIG. 14 is a diagram illustrating one example of a second processing sequence according to the third embodiment.
Figure 15:
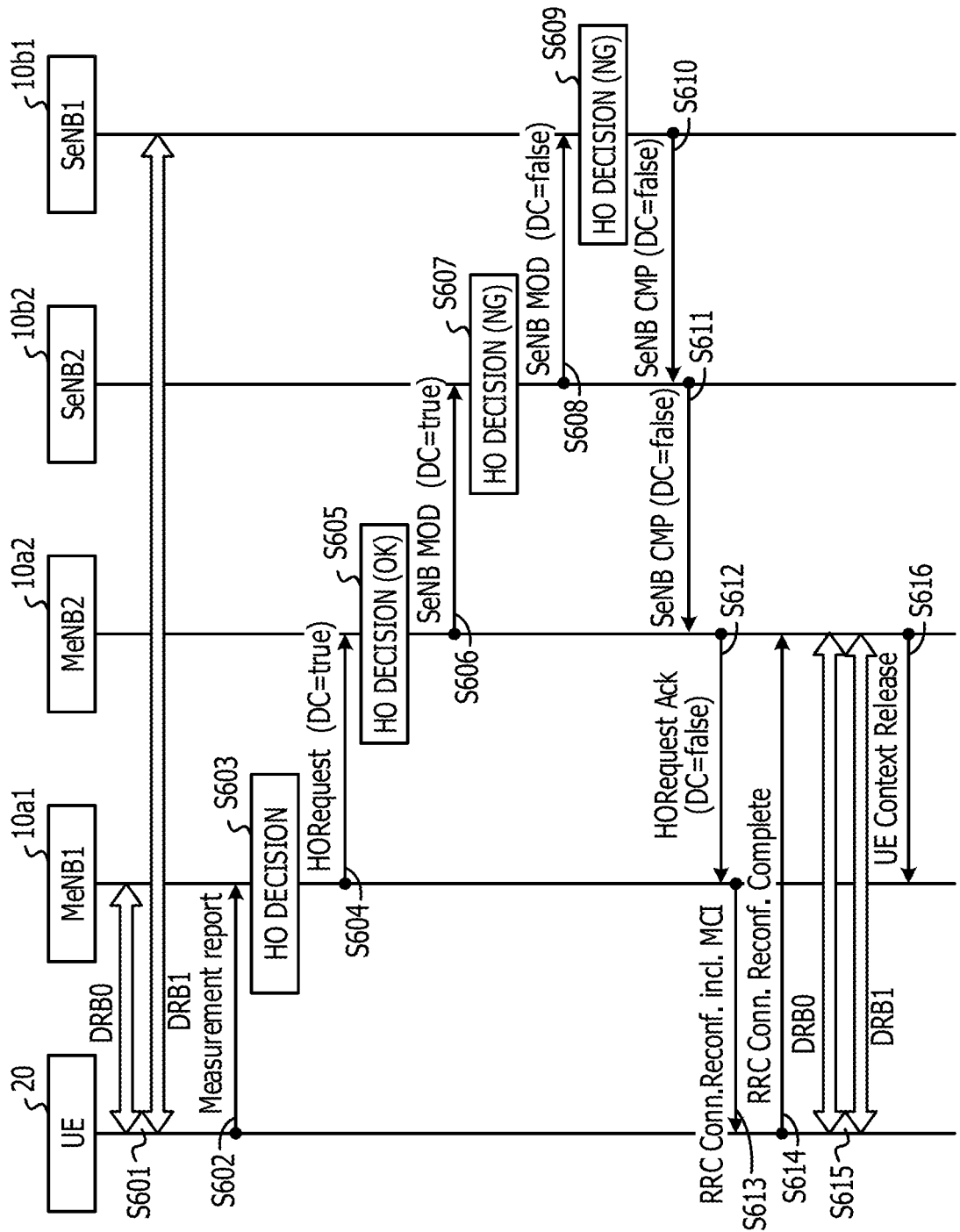
FIG. 15 is a diagram illustrating one example of a third processing sequence according to the third embodiment.

FIGS. 13 to 15 illustrate one example of a processing sequence according to the fourth embodiment. FIGS. 13 to 15 correspond to the processing sequence according to the second embodiment, which is illustrated in FIG. 7 and FIGS. 10 and 11. For this reason, at this point, a description of each procedure is omitted, and only the gist is described.

For example, in S405 to S409 in FIG. 13, the second macro base station 10a2, the second small base station 10b2, and the first small base station 10b1 in this order make the decision of the continuance or release of the dual connectivity. At this point, FIG. 13 is equivalent to a case where any one of the second macro base station 10a2, the second small base station 10b2, and the first small base station 10b1 makes the decision of the continuance (DC=OK) of the dual connectivity. In contrast, FIG. 14 is equivalent to a case where any one of the second macro base station 10a2, the second small base station 10b2, and the first small base station 10b1 makes the decision of the release (DC=NG) of the dual connectivity. Furthermore, FIG. 15 is equivalent to a case where the second macro base station 10a2 makes the decision of the continuance of the dual connectivity, but the second small base station 10b2 and the first small base station 10b1 make the release of the dual connectivity. Moreover, it is noted that it is not assumed that only the first small base station 10b1 makes the decision of the release of the dual connectivity.

Moreover, in the HO Request message according to the second embodiment, which is described above, the same value is stored in Target Secondary Cell ID and Old Target Secondary Cell ID, but according to the fourth embodiment, different values are stored in Target Secondary Cell ID and Old Target Secondary Cell ID, respectively. Specifically, the identifier of the small base station 10b (the first small base station 10b1 in this case) to which the wireless terminal 20 makes the dual connectivity after the handover is stored in Target Secondary Cell ID. On the other hand, the identifier of the small base station 10b (the second small base station 10b2 in this case) that the wireless terminal 20 makes the dual connectivity before the handover is stored in Old Target Secondary Cell ID. According to the fourth embodiment, this is done because the small base station 10a is also changed before and after the handover.

Furthermore, according to the fourth embodiment, the HO Request information element is designated as follows. As described above, according to the present embodiment, different values are stored in Target Secondary Cell ID and Old Target Secondary Cell ID, respectively. In this case, the DL Forwarding information element is configured for the continuance in the small base station 10b between each bearer. The reason for this is that even if the continuance takes place in the small base station 10b, because according to the present embodiment the small base station 10b is switched, the transfer of the downlink communication is indispensable. In contrast, the DL Forwarding information element is not configured (that is, is not notified) for handing over to the target base station 10 without the continuance taking placing in the small base station 10b between each bearer. It is noted that in this manner, rules for the configuration of the DL Forwarding information element according to the second embodiment and the fourth embodiment are the reverse of each other.

In the same manner, according to the fourth embodiment, the DL GTP Tunnel Endpoint information element and the UL GTP Tunnel Endpoint information element of HO Request ACK are designated as follows. As described above, according to the present embodiment, different values are stored in Target Secondary Cell ID and Old Target Secondary Cell ID, respectively. In this case, the DL GTP Tunnel Endpoint information element and the UL GTP Tunnel Endpoint information element are configured for the continuance in the small base station 10b between each bearer. The reason for this is that even if the continuance takes place in the small base station 10b, because according to the present embodiment the small base station 10b is switched, the notification of the uplink or downlink communication endpoint is indispensable. In contrast, the DL GTP Tunnel Endpoint information element and the UL GTP Tunnel Endpoint information element are not configured (that is, is not notified) for handing over to the target base station 10 without the continuance taking placing in the small base station 10b between each bearer. It is noted that in this manner, rules for the configuration of the DL GTP Tunnel Endpoint information element and the UL GTP Tunnel Endpoint information element according to the second embodiment and the fourth embodiment are the reverse of each other.

Returning to the description that is provided referring to FIG. 13, in S415, the wireless terminal 20 is in a state of making the dual connectivity to the second macro base station 10a2 and the second small base station 10b2. At this time, the state where the data bearer DRB 0 is configured on the data channel (the PUSCH in the case of the uplink or the PDSCH in the case of the downlink) between the wireless terminal 20 and the second macro base station 10a2 is obtained. Furthermore, a state where the data bearer DRB 1 is configured for the data channel between the wireless terminal 20 and the second small base station 10b2 is obtained.

On the other hand, in FIGS. 14 and 15, as is illustrated in S515 or S615, the wireless terminal 20 is in the state of connecting to only the second macro base station 10a2 (that is, the dual connectivity is released). At this time, the state where the data bearers DRB 0 and DRB 1 are configured on the data channel (the PUSCH in the case of the uplink or the PDSCH in the case of the downlink) between the wireless terminal 20 and the second macro base station 10a2 is obtained.

Figure 16:
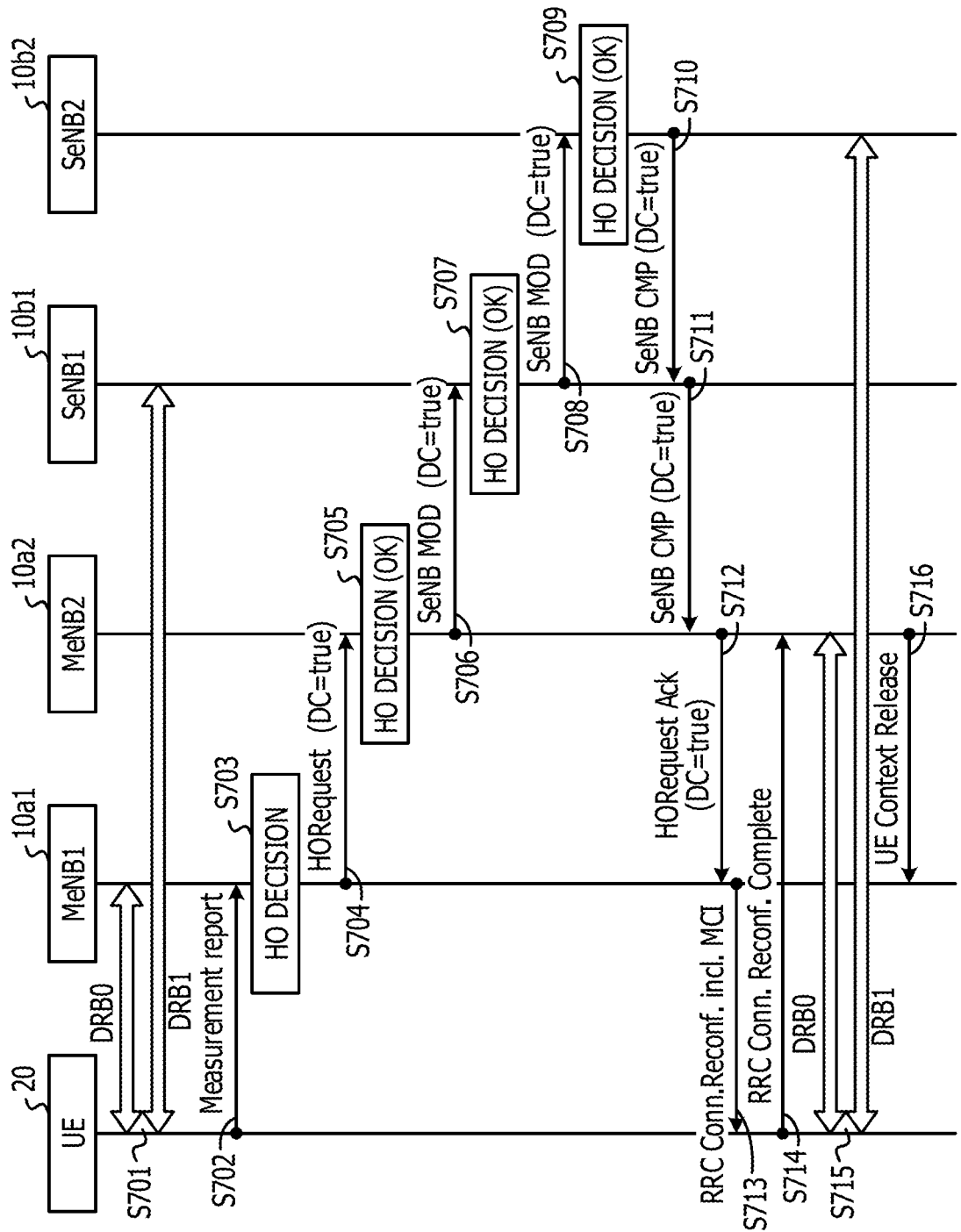
FIG. 16 is a diagram illustrating one example of a fourth processing sequence according to the third embodiment.
Figure 17:
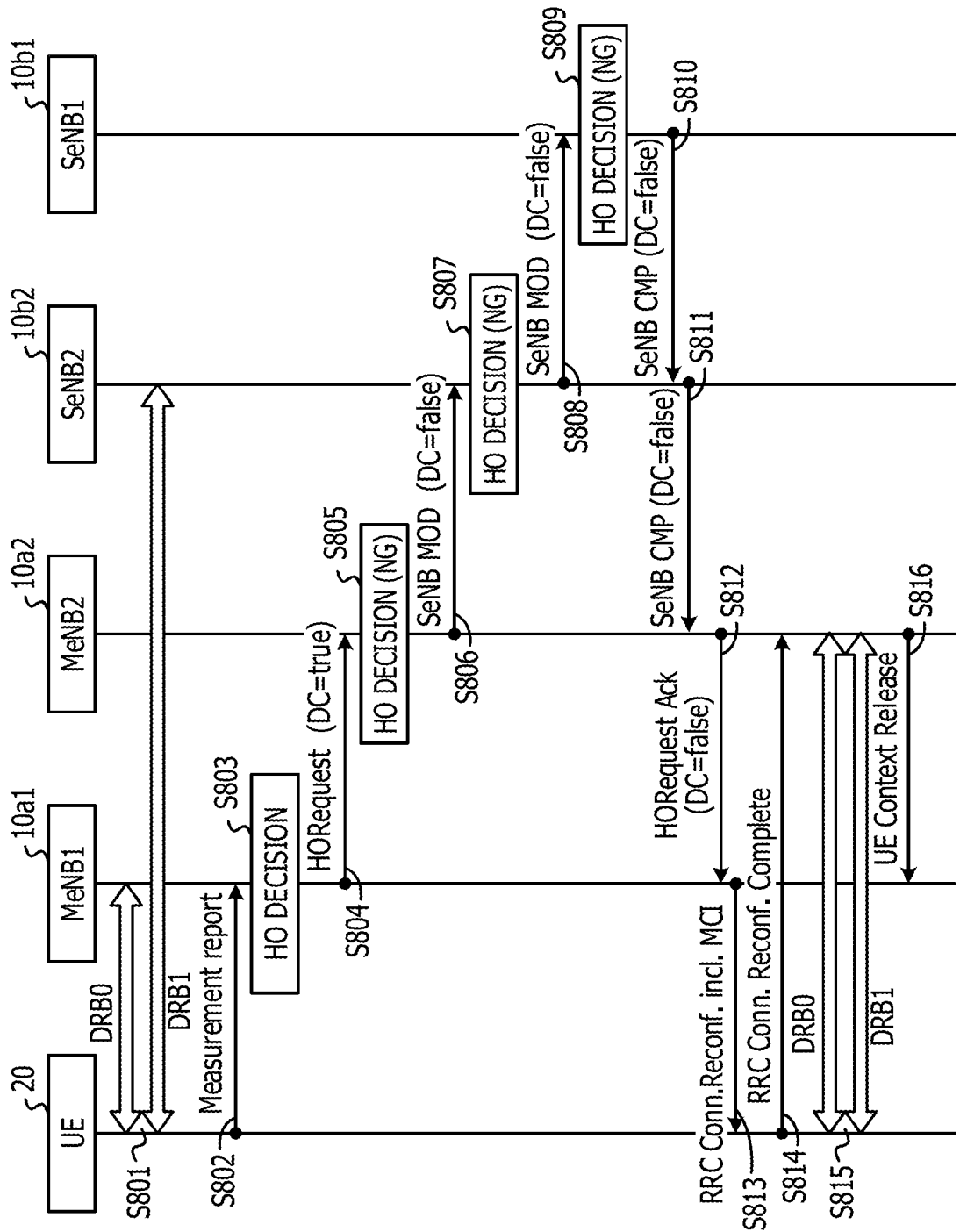
FIG. 17 is a diagram illustrating one example of a fifth processing sequence according to the third embodiment.
Figure 18:
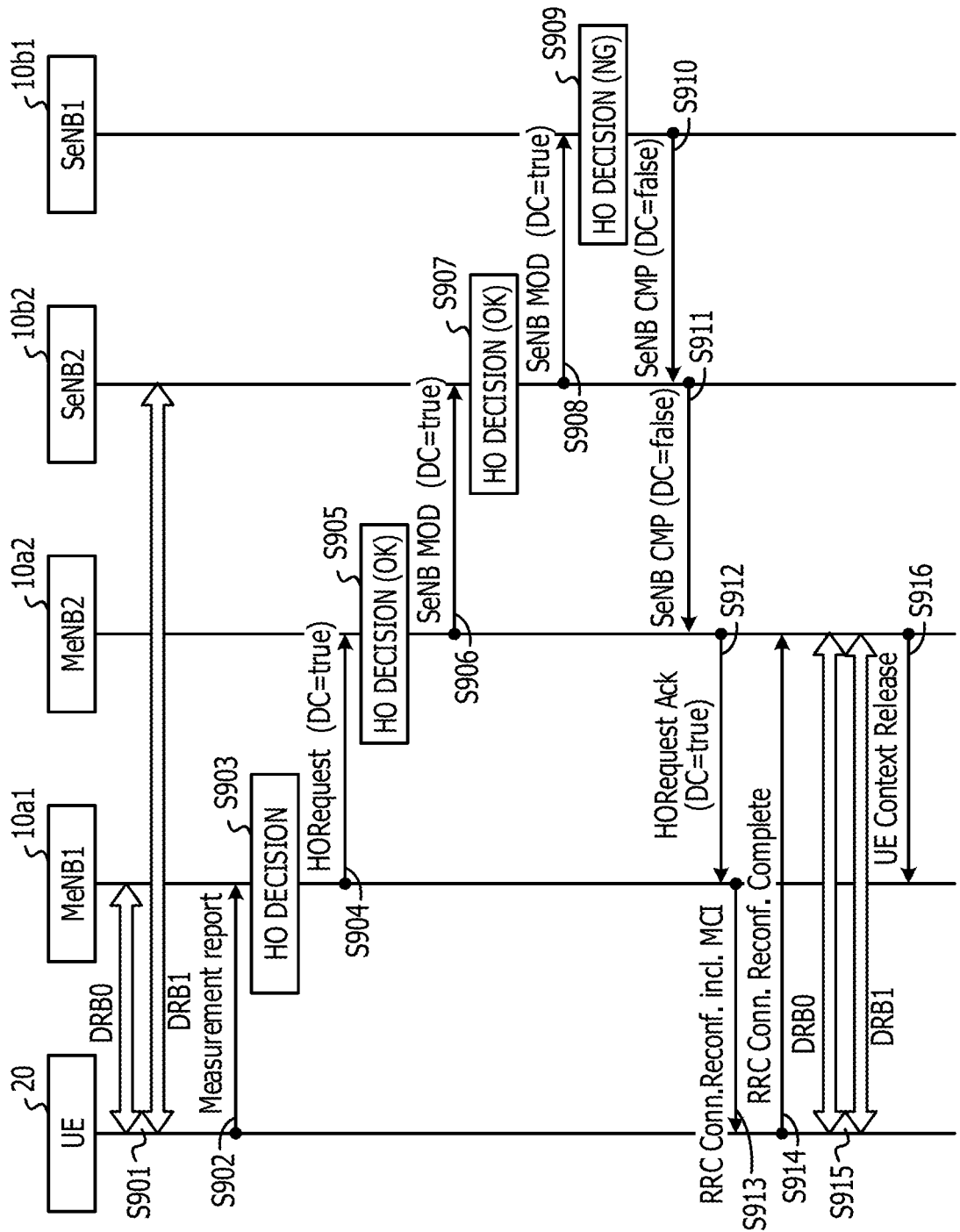
FIG. 18 is a diagram illustrating one example of a sixth processing sequence according to the third embodiment.

Additionally, FIGS. 16 to 18 illustrate an example of a processing sequence according to a modification example of the fourth embodiment. Because FIGS. 16 to 18 correspond to FIGS. 13 to 15, respectively, at this point, a description of each procedure is omitted, and only the gist is described. Moreover, it is noted that in FIGS. 16 to 18 and FIGS. 13 to 15, a position of the first small base station 10b1 is exchanged with a position of the second small base station 10b2 in the drawings.

For example, in S705 to S709 in FIG. 16, the second macro base station 10a2, the first small base station 10b1, and the second small base station 10b2 in this order make the decision of the continuance or release of the dual connectivity. The decision order in FIGS. 16 to 18 is different from the decision order in FIGS. 13 to 15.

FIG. 16 is equivalent to a case where any one of the second macro base station 10a2, the first small base station 10b1, and the second small base station 10b2 makes the decision of the continuance (DC=OK) of the dual connectivity. In contrast, FIG. 17 is equivalent to a case where any one of the second macro base station 10a2, the first small base station 10b1, and the second small base station 10b2 makes the decision of the release (DC=NG) of the dual connectivity. Furthermore, FIG. 18 is equivalent to a case where the second macro base station 10a2 and the first small base station 10b1 make the decision of the continuance of the dual connectivity, but the second small base station 10b2 makes the release of the dual connectivity. Moreover, it is noted that it is not assumed that only the first small base station 10b1 makes the decision of the release of the dual connectivity.

In summary, according to the fourth embodiment, in the same manner as in the embodiments described above, when the wireless terminal 20 that has the dual connectivity performs the handover, the first macro base station ends up even without temporarily handing over the data bearer that is configured for the first small base station 10b1. For this reason, according to the fourth embodiment, it is possible that the handover is performed with the small number of procedures when compared with the reference technology described above. Accordingly, according to the fourth embodiment, the handover by the terminal 20 that has the dual connectivity can be shortened, and the concern, such as the instantaneous disconnection, which results when the handover takes the time, can be reduced. Therefore, according to the fourth embodiment, the effect in which the mobile control that is desirable in the case where the dual connectivity is realized is performed, which is not available in the related art, is accomplished.

Last, it goes without saying this, but it is noted that the information element name, the parameter name, or the like in a control signal that is transmitted and received by the wireless base station 10 or the wireless terminal 20 according to each of the embodiments described above is only one example. Furthermore, even in a case where there is a different arrangement (order) of parameters and an arbitrary (optional) information element or parameter is not used, it goes without saying that this is included in the scope of the invention in the present application as long as this departs from the gist of the invention of the present application.

[Network Constitution of the Wireless Communication System According to Each of the Embodiments]

Figure 19:
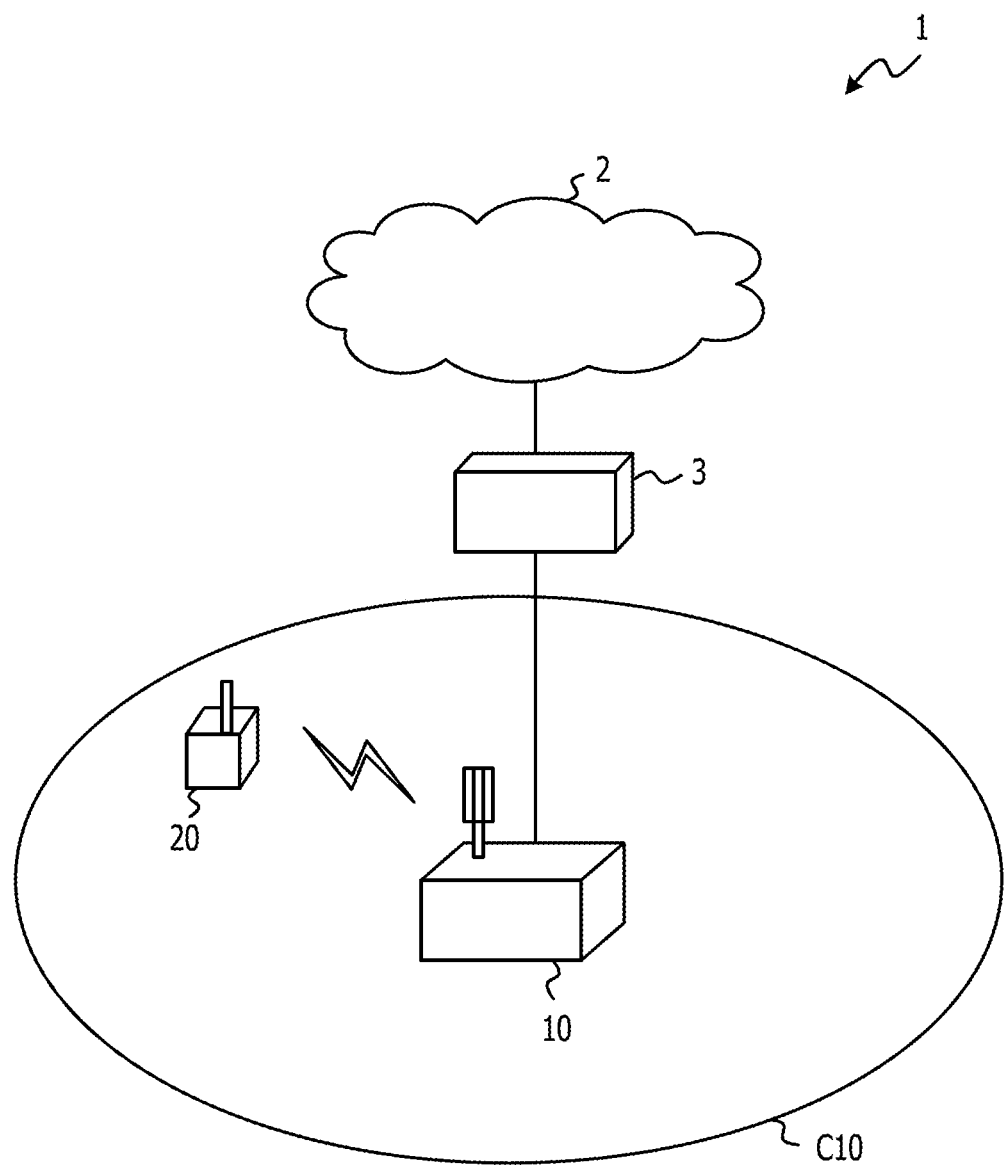
FIG. 19 is a diagram illustrating one example of a network constitution of a wireless communication system according to each of the embodiments.

Next, a network constitution of a wireless communication system 1 according to each of the embodiments is described referring to FIG. 19. As illustrated in FIG. 19, the wireless communication system 1 has the wireless base station 10 and the wireless terminal 20. The wireless base station 10 (including the first macro base station 10a1, the second macro base station 10a2, the first small base station 10b1, and the second small base station 10b2) forms a cell C10. The wireless terminal 20 is present in the cell C10. Moreover, it is noted that the wireless base station 10 or the wireless terminal 20 in the present application is referred to as the wireless station.

The wireless base station 10 is connected to a network device 3 (including the MME/SGW 30) through a wired connection, and the network device 3 is connected to a network 2 through the wired connection. The wireless base station 10 is provided in such a manner that it is possible that the wireless base station 10 transmits and receives data or control information to and from a different wireless base station 10 through the network device 3 and the network 2.

The wireless base station 10 may be made up of separate devices. One has a function of performing wireless communication with the wireless terminal 20, and the other has a function of performing digital signal processing and a control function. In this case, the device equipped with the wireless communication function is referred to as a remote radio head (RRH), and the device equipped with the digital signal processing and the control function is referred to as a base band unit (BBU). The RRH may be installed in a state of protruding from the BBU, and an optical fiber and the like may provide a connection between the RRH and the BBU in the wired manner. Furthermore, the wireless base stations 10 may include not only a macro wireless base station 10 and small-sized wireless base stations 10 (including a micro wireless base station 10, a femto wireless base station 10, and the like), such as a pico wireless base station 10, but also variously-sized wireless base stations 10. Furthermore, in a case where a relay station is used that relays wireless communication between the wireless base station 10 and the wireless terminal 20, the relay station (transmission to and reception from the wireless terminal 20 and control of the transmission and reception) may also be set to be included in the wireless base station 10 in the present application.

On the other hand, the wireless terminal 20 performs the communication with the wireless base station 10 using wireless communication.

The wireless terminals 20 may include a portable telephone, a smartphone, a personal digital assistant (PDA), a personal computer, and wireless terminals 20, such as various apparatuses or devices (a sensing device or the like) that are equipped with the wireless communication function. Furthermore, in the case where the relay station is used that relays the wireless communication between the wireless base station 10 and the wireless terminal 20, the relay station (transmission to and reception from the wireless base station 10 and control of the transmission and reception) may also be set to be included in the wireless terminal 20 in the present application.

The network device 3, for example, includes a communication unit and a control unit. These constituent elements are connected to one another in such a manner that it is possible that a signal or data is input and output in a one-way direction or in a two-way direction. The network device 3, for example, is realized by a gateway. As a hardware constitution of the network device 3, for example, the communication unit is realized as an interface circuit, and the control unit is realized as a processor and a memory.

Moreover, specific aspects of distribution•integration of constituent elements of the wireless base station 10 and the wireless terminal 20 are not limited to aspects of the embodiments described above. A configuration can be provided in which all or some of the constituent elements are distributed•integrated functionally or physically in an arbitrary unit according to various loads or operating conditions, or the like. For example, a connection to the memory as an external device of the wireless base station 10 and the wireless terminal 20 may be set to be established through a network or a cable.

[Functional Constitution of Each Device in the Wireless Communication System According to Each of Embodiments]

Figure 20:
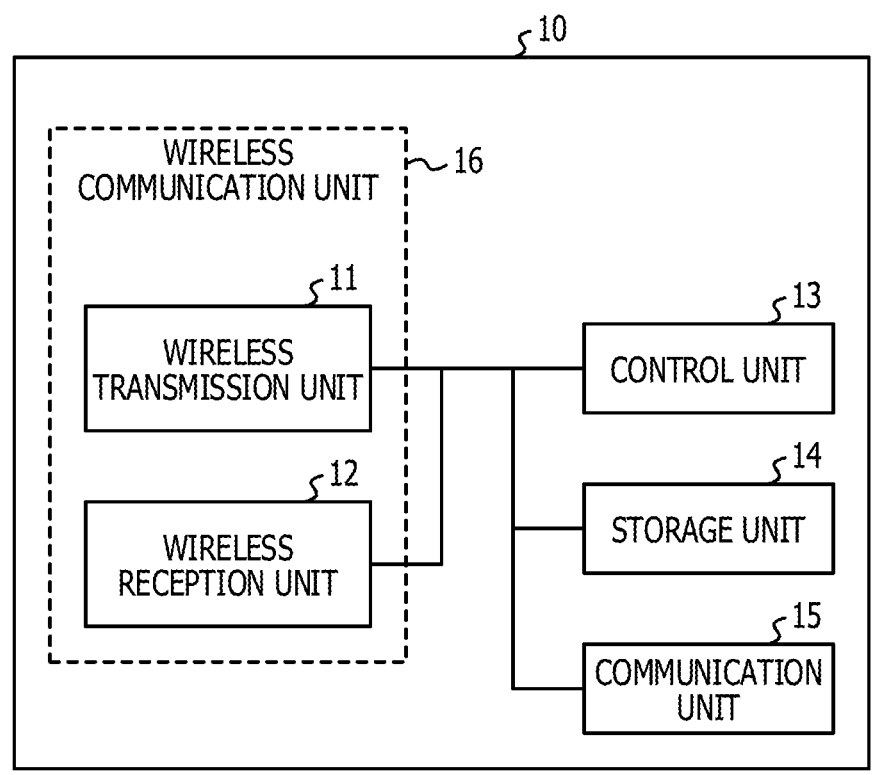
FIG. 20 is a diagram illustrating one example of a functional constitution of the base station according to each of the embodiments.
Figure 21:
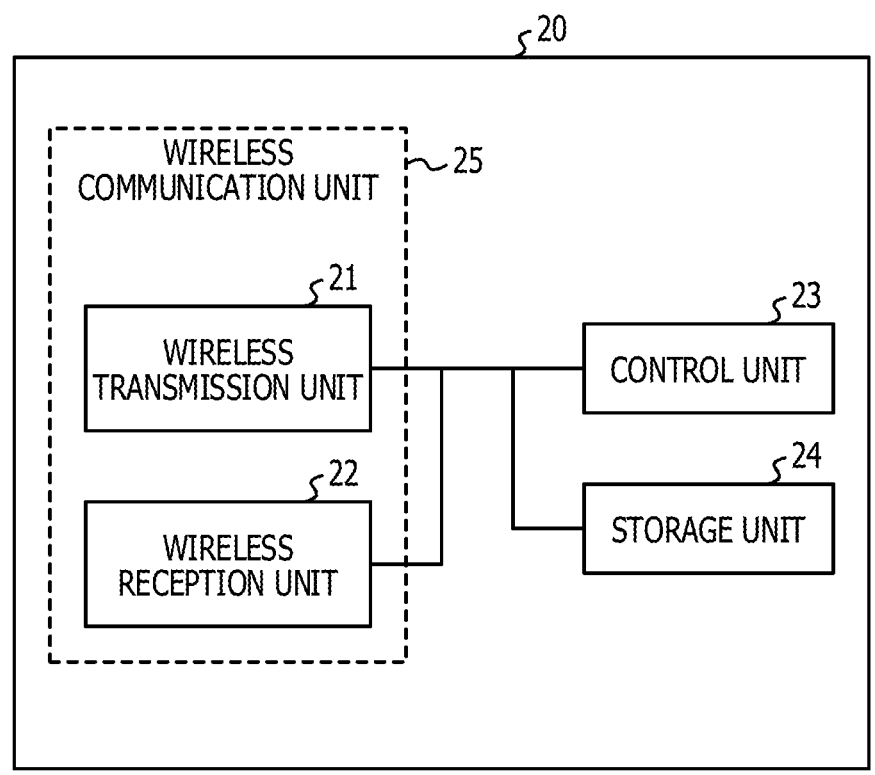
FIG. 21 is a diagram illustrating one example of a functional constitution of a wireless terminal according to each of the embodiments.

Next, referring to FIGS. 20 and 21, a functional constitution of each device in a wireless communication system according to each of the embodiments is described.

FIG. 20 is a block diagram illustrating one example of a functional constitution of the wireless base station 10 (including the first macro base station 10a1, the second macro base station 10a2, the first small base station 10b1, and the second small base station 10b2). As illustrated in FIG. 20, the wireless base station 10 includes, for example, a wireless transmission unit 11, a wireless reception unit 12, a control unit 13, a storage unit 14, and a communication unit 15. These constituent components are connected to one another in such a manner that it is possible that a signal or data is input and output in a one-way direction or in a two-way direction. Moreover, the wireless transmission unit 11 and the wireless reception unit 12 are collectively referred to as a wireless communication unit 16.

The wireless transmission unit 11 transmits a data signal or a control signal through an antenna using the wireless communication. Moreover, the antenna may be shared for transmission and reception. The wireless transmission unit 11 transmits a wireless signal (a downlink wireless signal) to the wireless terminal 20. The wireless signal that is transmitted by the wireless transmission unit 11 can include arbitrary user data or control information, or the like (which results from performing coding, modulation, or the like), which is destined for the wireless terminal 20.

As a specific example of the wireless signal that is transmitted by the wireless transmission unit 11, each wireless signal is given that is transmitted by each wireless base station 10 (including the first macro base station 10a1, the second macro base station 10a2, the first small base station 10b1, and the second small base station 10b2) in FIGS. 6 and 7 and FIGS. 10 to 18 to the wireless terminal 20. The wireless signal that are transmitted by the wireless transmission unit 11 are not limited to these, and include all wireless signals that are transmitted by each wireless base station 10 to the wireless terminal 20 according to each of the embodiments described above and a modification example.

The wireless reception unit 12 receives a data signal or a control signal through an antenna using the wireless communication. The wireless reception unit 12 receives a wireless signal (an uplink wireless signal) from the wireless terminal 20. The wireless signal that is received by the wireless reception unit 12 can include arbitrary user data or control information, or the like (which results from performing the coding, the modulation, or the like), which is transmitted by the wireless terminal 20.

As a specific example of the wireless signal that is received by the wireless reception unit 12, each wireless signal is given that is received by each wireless base station 10 (including the first macro base station 10a1, the second macro base station 10a2, the first small base station 10b1, and the second small base station 10b2) in FIGS. 6 and 7 and FIGS. 10 to 18 from the wireless terminal 20. The wireless signal that are received by the wireless reception unit 12 are not limited to these, and include all wireless signals that are received by each wireless base station 10 from the wireless terminal 20 according to each of the embodiments described above and the modification example.

The control unit 13 outputs data or control information that is transmitted to the wireless terminal 20, to the wireless transmission unit 11. The control unit 13 inputs data or control information that is received from the wireless terminal 20, from the wireless reception unit 12. The control unit 13 inputs and outputs data, control information, a program, and the like between the control unit 13 itself and the storage unit 14 that will be described below. The control unit 13 inputs and outputs data or control information that is transmitted and received to and from the other party, such as a different wireless base station 10, between the control unit 13 itself and the communication unit 15 that will be described below. In addition to these, the control unit 13 performs various control operations in the wireless base station 10.

As specific examples of processing that is controlled by the control unit 13, control for each signal that is transmitted and received by each wireless base station 10 (including the first macro base station 10a1, the second macro base station 10a2, the first small base station 10b1, and the second small base station 10b2) in FIGS. 6 to 7, and FIGS. 10 to 18, and control for each processing operation that is performed by each wireless base station 10 are given. Processing operations that are controlled by the control unit 13 are not limited to these, and include types of control relating to all processing operations that are performed by each wireless base station 10 according to each of the embodiments described above and the modification example.

Various pieces of information, such as data, control information, a program, are stored in the storage unit 14. Various pieces of information that are stored in the storage unit 14 include all pieces of information that are stored in each wireless base station 10 (including the first macro base station 10a1, the second macro base station 10a2, the first small base station 10b1, and the second small base station 10b2) according to each of the embodiments described above and the modification example.

The communication unit 15 transmits and receives data or control information to and from the other party, such as a different wireless base station 10, through a wired signal (possibly, a wireless signal) and the like. According to each of the embodiments and the modification example, which are described above, the wired signal and the like that are transmitted and received by the communication unit 15 include all wired signals and the like that are transmitted and received by each wireless base station 10 to and from the other party that is a different wireless base station 10 or a higher device (including the MME/SGW 30).

As a specific example of the wired signal that is transmitted by the communication unit 15, each wired signal is given that is transmitted by each wireless base station 10 (including the first macro base station 10a1, the second macro base station 10a2, the first small base station 10b1, and the second small base station 10b2) in FIGS. 6 and 7, and FIGS. 10 to 18 to a different wireless base station 10 (including the first macro base station 10a1, the second macro base station 10a2, the first small base station 10b1, and the second small base station 10b2). Furthermore, as a specific example of the wired signal that is received by the communication unit 15, each wired signal is given that is received by each wireless base station 10 (including the first macro base station 10a1, the second macro base station 10a2, the first small base station 10b1, and the second small base station 10b2) in FIGS. 6 and 7, and FIGS. 10 to 18 from a different wireless base station 10 (including the first macro base station 10a1, the second macro base station 10a2, the first small base station 10b1, and the second small base station 10*b*2). The wired signals that are transmitted and received by the communication unit 15 are not limited to these, and include all wired signals that are transmitted and received between each wireless base station 10 or between each wireless base station 10 and a higher device according to each of the embodiments described above and the modification example.

Moreover, although the wireless base station 10 transmits and receives a wireless signal to and from a wireless communication device (for example, a different wireless base station 10 or a relay station) other than the wireless terminal 20 through the wireless transmission unit 11 or the wireless reception unit 12, this poses no problem.

FIG. 21 is a block diagram illustrating one example of a functional constitution of the wireless terminal 20. As illustrated in FIG. 21, the wireless terminal 20 includes, for example, a wireless transmission unit 21, a wireless reception unit 22, a control unit 23, and a storage unit 24. These constituent components are connected to one another in such a manner that it is possible that a signal or data is input and output in a one-way direction or in a two-way direction. Moreover, the wireless transmission unit 21 and the wireless reception unit 22 are collectively referred to as a wireless communication unit 25.

The wireless transmission unit 21 transmits a data signal or a control signal through an antenna using the wireless communication. Moreover, the antenna may be shared for transmission and reception. The wireless transmission unit 21 transmits the wireless signal (the uplink wireless signal) to each wireless base station 10. The wireless signal that is transmitted by the wireless transmission unit 21 can include arbitrary user data or control information, or the like (which results from performing the coding, the modulation, or the like), which is destined for each wireless base station 10.

As a specific example of the wireless signal that is transmitted by the wireless transmission unit 21, each wireless signal is given that is transmitted by each wireless terminal 20 in FIGS. 6 and 7 and FIGS. 10 to 18 to the wireless base station 10 (including the first macro base station 10*a*1, the second macro base station 10*a*2, the first small base station 10*b*1, and the second small base station 10*b*2). The wireless signal that are transmitted by the wireless transmission unit 21 are not limited to these, and include all wireless signals that are transmitted by each wireless terminal 20 to each wireless base station 10 according to each of the embodiments described above and the modification example.

The wireless reception unit 22 receives a data signal or a control signal through an antenna using the wireless communication. The wireless reception unit 22 receives the wireless signal (the downlink wireless signal) from each wireless base station 10. The wireless signal that is received by the wireless reception unit 22 can include arbitrary user data or control information, or the like (which results from performing the coding, the modulation, or the like), which is transmitted by each wireless base station 10.

As a specific example of the wireless signal that is received by the wireless reception unit 22, each wireless signal is given that is received by each wireless terminal 20 in FIGS. 6 and 7 and FIGS. 10 to 18 from each wireless base station 10 (including the first macro base station 10*a*1, the second macro base station 10*a*2, the first small base station 10*b*1, and the second small base station 10*b*2). The wireless signal that are received by the wireless reception unit 22 are not limited to these, and include all wireless signals that are received by each wireless terminal 20 from each wireless base station 10 according to each of the embodiments described above and the modification example.

The control unit 23 outputs data or control information that is transmitted to each wireless base station 10, to the wireless transmission unit 21. The control unit 23 inputs data or control information that is received from each wireless base station 10, into the wireless reception unit 22. The control unit 23 inputs and outputs data, control information, a program, and the like between the control unit 23 itself and the storage unit 24 that will be described below. In addition to these, the control unit 23 performs various control operations in the wireless terminal 20.

As specific examples of processing that is controlled by the control unit 23, control for each signal that is transmitted and received by the wireless terminal 20 in FIGS. 6 to 7, and FIGS. 10 to 18, and control for each processing operation that is performed by the wireless terminal 20 are given. Processing operations that are controlled by the control units 23 are not limited to these, and include types of control relating to all processing operations that are performed by the wireless terminal 20 according to each of the embodiments described above and the modification example.

Various pieces of information, such as data, control information, a program, are stored in the storage unit 24. The various pieces of information that are stored in the storage unit 24 include all pieces of information that are stored in the wireless terminal 20 according to each of the embodiments described above and the modification example.

Moreover, although the wireless terminal 20 transmits and receives a wireless signal to and from a wireless communication device other than the wireless base station 10 through the wireless transmission unit 21 or the wireless reception unit 22, this pose no problem.

[Hardware Constitution of Each Device in the Wireless Communication System According to Each of the Embodiments]

Figure 22:
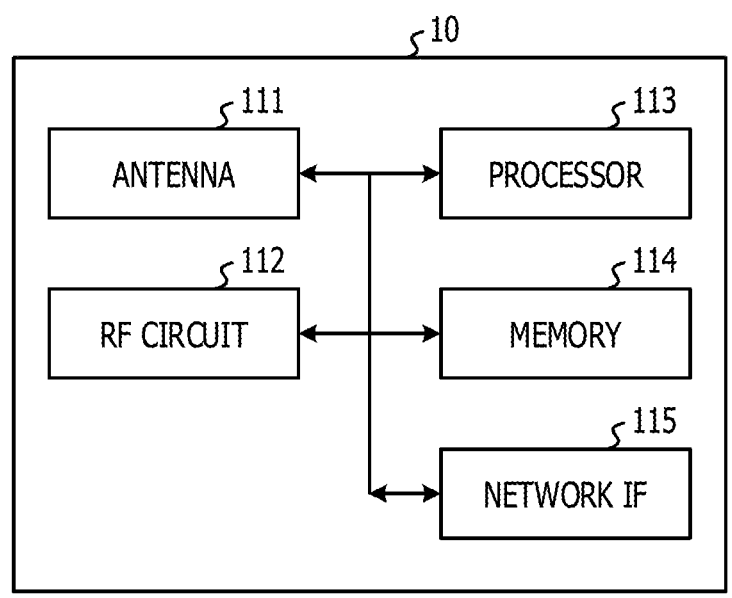
FIG. 22 is a diagram illustrating one example of a hardware constitution of the base station according to each of the embodiments.
Figure 23:
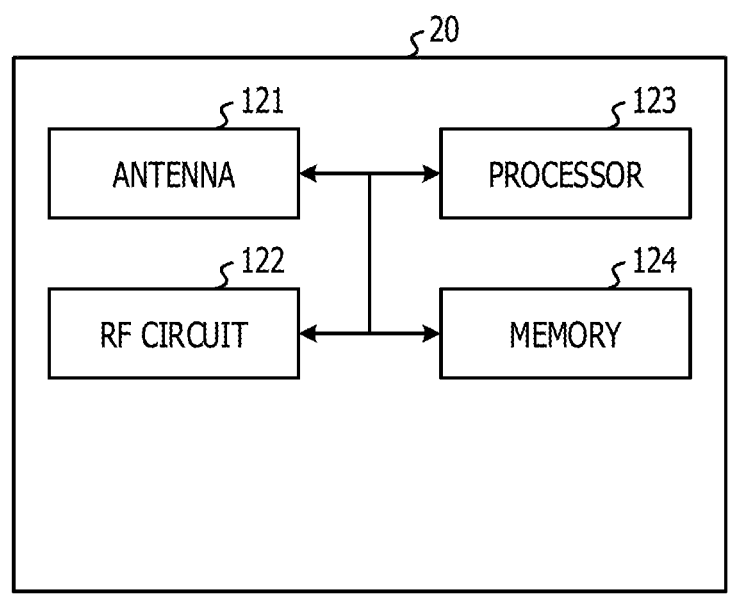
FIG. 23 is a diagram illustrating a hardware constitution of the wireless terminal according to each of the embodiments.

A hardware constitution of each device in the wireless communication system according to each of the embodiments and each of the modification examples is described referring to FIGS. 22 and 23.

FIG. 22 is a diagram illustrating one example of a hardware constitution of the wireless base station 10 (including the first macro base station 10*a*1, the second macro base station 10*a*2, the first small base station 10*b*1, and the second small base station 10*b*2). As illustrated in FIG. 22, the wireless base station 10 has, for example, a radio frequency circuit (RF) 112 including an antenna 111, a processor 113, a memory 114, and a network interface (IF) 115, as hardware constituent elements. These constituent elements are connected to one another in such a manner that it is possible that various signals or pieces of data are input and output through a bus.

The processor 113 is, for example, a central processing unit (CPU) or a digital signal processor (DSP). Although the processor 113 is realized as a digital electronic circuit, this poses no problem in the present application. As the digital electronic circuits, for example, an application specific integrated circuit (ASIC), a field-programmable gate array (FPGA), a large scale integration (LSI), and the like are given.

The memory 114 includes at least any one of a random access memory (RAM), for example, such as a synchronous dynamic random access memory (SDRAM), a read only memory (ROM), and a flash memory. A program, control information, or data is stored in the memory 114. In addition, the wireless base station 10 may include an auxiliary storage device (a hard disk or the like) and the like, which are not illustrated.

A correspondence between a functional constitution of the wireless base station 10 that is illustrated in FIG. 20 and a hardware constitution of the wireless base station 10 that is illustrated in FIG. 22 is described. The wireless transmission unit 11 and the wireless reception unit 12 (or the wireless communication unit 16) are realized as, for example, the RF circuit 112, or the antenna 111 and the RF circuit 112. The control unit 13 is realized as, for example, the processor 113, the memory 114, and a digital electronic circuit or the like that is not illustrated. The storage unit 14 is realized as, for example, the memory 114. The communication unit 15 is realized as, for example, a network IF 115.

FIG. 23 is a diagram illustrating one example of the hardware constitution of the wireless terminal 20. As illustrated in FIG. 23, the wireless terminal 20 includes, for example, a radio frequency (RF) circuit 122 including an antenna 121, a processor 123, and a memory 124, as hardware constituent elements. These constituent elements are connected to one another in such a manner that it is possible that various signals or pieces of data are input and output through a bus.

The processor 123 is, for example, a central processing unit (CPU) or a digital signal processor (DSP). Although the processor 123 is realized as a digital electronic circuit, this poses no problem in the present application. As the digital electronic circuits, for example, an application specific integrated circuit (ASIC), a field-programmable gate array (FPGA), a large scale integration (LSI), and the like are given.

The memory 124 includes at least any one of a random access memory (RAM), for example, such as a synchronous dynamic random access memory (SDRAM), a read only memory (ROM), and a flash memory. A program, control information, or data is stored in the memory 124.

A correspondence between a functional constitution of the wireless terminal 20 that is illustrated in FIG. 21 and a hardware constitution of the wireless terminal 20 that is illustrated in FIG. 23 is described. The wireless transmission unit 21 and the wireless reception unit 22 (or the wireless communication unit 25) are realized as, for example, the RF circuit 122, or the antenna 121 and the RF circuit 122. The control unit 23 is realized as, for example, the processor 123, the memory 124, and a digital electronic circuit or the like that is not illustrated. The storage unit 24 is s realized as, for example, the memory 124.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication method comprising:
    transmitting, by a first base station that is a primary base station for a wireless station, to a third base station, a first signal requesting a switching of the primary base station to the third base station when the wireless station has a multiple connection and when a handover of the wireless station from the first base station to the third base station is to be performed, wherein
    the multiple connection comprises at least a first connection and a second connection, and
    the first connection is a connection between the wireless station and the first base station, and
    the second connection is a connection between the wireless station and a second base station that is a secondary base station for the wireless station;
    transmitting, by the third base station, to the second base station a second signal requesting that the second connection is to be maintained when the third base station receives the first signal and determines that the second connection is to be maintained;
    transmitting, by the second base station, to the third base station a third signal indicating a positive response to the second signal when the second base station receives the second signal and determines that the second connection is to be maintained;
    transmitting, by the third base station, to the first base station a fourth signal indicating that the second connection is to be maintained when the third base station receives the third signal; and
    performing, by the first base station and the third base station, the handover and the switching without transferring the second connection to neither the first base station nor the third base station.

2. The wireless communication method according to claim 1, wherein the first signal includes an identifier of the second base station.

3. The wireless communication method according to claim 1, wherein
    transmitting, by the second base station, to the third base station a fifth signal indicating a negative response to the second signal when the second base station receives the second signal and determines that the second connection is not to be maintained;
    transmitting, by the third base station, to the first base station a sixth signal indicating that the second connection is not to be maintained when the third base station receives the fifth signal; and
    performing, by the first base station and the third base station, the handover and the switching with transferring the second connection to the third base station.

4. A wireless communication system comprising:
    a wireless station;
    a first base station;
    a second base station; and
    a third base station, wherein
    the first base station that is a primary base station for the wireless station is configured to transmit to the third base station a first signal requesting a switching of a primary base station to the third base station when the wireless station has a multiple connection and when a handover of the wireless station from the first base station to the third base station is to be performed, wherein
    the multiple connection comprises at least a first connection and a second connection, and
    the first connection is a connection between the wireless station and the first base station, and
    the second connection is a connection between the wireless station and the second base station that is a secondary base station for the wireless station,
    the third base station is configured to transmit to the second base station a second signal requesting that the second connection is to be maintained when the third base station receives the first signal and determines that the second connection is to be maintained, the second base station is configured to transmit to the third base station a third signal indicating a positive response to the second signal when the second base station receives the second signal and determines that the second connection is to be maintained, the third base station is configured to transmit to the first base station a fourth signal indicating that the second connection is to be maintained when the third base station receives the third signal, and the first base station and the third base station are configured to perform the handover and the switching without transferring the second connection to neither the first base station nor the third base station.

5. The wireless communication system according to claim 4, wherein the second base station is configured to transmit to the third base station a fifth signal indicating a negative response to the second signal when the second base station receives the second signal and determines that the second connection is not to be maintained, the third base station is configured to transmit to the first base station a sixth signal indicating that the second connection is not to be maintained when the third base station receives the fifth signal, and the first base station and the third base station are configured to perform the handover and the switching with transferring the second connection to the third base station.

6. A second base station comprising:
a communication unit; and
a controller, wherein the communication unit is configured to receive a second signal requesting that a second connection is to be maintained, the second signal being transmitted from a third base station as a result of determining, by the third base station, that the second connection is to be maintained when a wireless station has a multiple connection and when a handover of the wireless station from a first base station that is a primary base station for the wireless station to the third base station is to be performed, the multiple connection comprising at least a first connection and the second connection, and the first connection being a connection between the wireless station and the first base station, and the second connection being a connection between the wireless station and the second base station that is a secondary base station for the wireless station, the controller is configured to determine whether the second connection is to be maintained when the controller receives the second signal via the communication unit, and the communication unit is configured to transmit to the third base station a third signal indicating a positive response to the second signal when the controller determines that the second connection is to be maintained.

7. The second base station according to claim 6, wherein
the communication unit is configured to transmit to the third base station a fifth signal indicating a negative response to the second signal when the controller determines that the second connection is not to be maintained.

8. A third base station comprising:
a communication unit; and
a controller, wherein the communication unit is configured to receive a first signal requesting a switching of a primary base station for a wireless station to the third base station when the wireless station has a multiple connection and when a handover of the wireless station from a first base station that is the primary base station to the third base station is to be performed, the multiple connection comprising at least a first connection and a second connection, and the first connection being a connection between the wireless station and the first base station, and the second connection being a connection between the wireless station and a second base station that is a secondary base station for the wireless station, the controller is configured to determine whether the second connection is to be maintained when the controller receives the first signal via the communication unit, the communication unit is configured to transmit to the second base station a second signal requesting that the second connection is to be maintained when the controller determines that the second connection is to be maintained, the communication unit is configured to transmit a fourth signal indicating that the second connection is to be maintained when the communication unit receives a third signal indicating a positive response to the second signal, the third signal being transmitted from the second base station as a result of determining, by the second base station, that the second connection is to be maintained, and the controller is configured to perform the handover and the switching without transferring the second connection to neither the first base station nor the third base station.

9. The third base station according to claim 8, wherein
the communication unit is configured to transmit a sixth signal indicating that the second connection is not to be maintained when the communication unit receives a fifth signal indicating a negative response to the second signal, the fifth signal being transmitted from the second base station as a result of determining, by the second base station, that the second connection is not to be maintained, and the controller is configured to perform the handover and the switching with transferring the second connection to the third base station.

* * * * *